United States Patent [19]
Persinger et al.

[11] Patent Number: 5,322,410
[45] Date of Patent: Jun. 21, 1994

[54] TUBE BUNDLE EXTRACTOR

[75] Inventors: Milo A. Persinger, Kerrville; Robert A. Baten; William L. Anderson, Jr., both of Houston, all of Tex.; Richard I. Cushman, Livonia, Mich.

[73] Assignee: Stewart & Stevenson Services, Inc., Houston, Tex.

[21] Appl. No.: 826,911

[22] Filed: Jan. 22, 1992

[51] Int. Cl.⁵ .................................................. B66F 11/00
[52] U.S. Cl. .................................. 414/745.3; 414/661; 29/726.5; 294/86.41
[58] Field of Search ............... 414/280, 626, 661, 746, 414/745.3; 29/726.5; 294/86.41

[56] References Cited

U.S. PATENT DOCUMENTS

| | | |
|---|---|---|
| 2,650,728 | 9/1953 | Goodwyn . |
| 2,867,334 | 1/1959 | Aiken et al. ......................... 414/661 |
| 3,180,498 | 4/1965 | Postlewaite ......................... 29/726.5 |
| 3,239,077 | 3/1966 | Huff et al. ............................ 29/726.5 |
| 3,257,001 | 6/1966 | Postlewaite et al. ............... 29/726.5 |
| 3,490,609 | 1/1970 | Poole . |
| 3,510,012 | 5/1970 | Van Materen ...................... 29/726.5 |
| 3,567,044 | 3/1971 | Travis . |
| 3,836,015 | 9/1974 | Travis . |
| 3,958,698 | 5/1976 | Van der Woerd ................. 414/745.3 |
| 4,104,790 | 8/1978 | Hindrichs ........................... 414/745.3 |
| 4,358,242 | 11/1982 | Davies . |
| 4,392,524 | 7/1983 | Bauch . |
| 4,543,711 | 10/1985 | Wada et al. ........................ 414/745.3 |
| 4,547,963 | 10/1985 | Ohmstede .......................... 414/745.3 |
| 4,575,305 | 3/1986 | Krajicek et al. ................... 414/745.3 |
| 4,666,365 | 5/1987 | Cradeur .............................. 414/745.3 |
| 4,718,377 | 1/1988 | Haller ................................. 414/745.3 |
| 4,869,638 | 9/1989 | Krajicek et al. . |
| 5,032,054 | 7/1991 | Krajicek et al. ................... 414/745.3 |
| 5,169,281 | 12/1992 | Boisture ............................. 414/745.3 |

Primary Examiner—David H. Bollinger
Attorney, Agent, or Firm—William E. Shull

[57] ABSTRACT

A heat exchanger tube bundle extractor having an improved sled and motive means operable to move the tube bundle into or out of its shell. A fixed screw shaft is provided on the chassis, and a rotatable drive nut on the sled. The drive nut is threadedly retained on the screw shaft. The drive nut is held against axial movement with respect to the sled by a gear box disposed on the sled. The gear box output includes a rotating shaft to which the drive nut is connected, which provides the drive nut with the appropriate speed and power to effectively pull the tube bundle from, or push it back into, the shell. A balance nut disposed on the opposite end of the drive shaft from the drive nut, and threadedly engaged with the screw shaft, reacts against side forces on the sled and screw shaft to assist in keeping the drive nut and screw shaft properly aligned. All of the power generation, conversion, and control equipment for operating the sled drive, a hydraulic breakout cylinder, and a hydraulic elevator is located on the sled itself in a compact and self-contained arrangement, and is movable along with the sled. This eliminates the piping, cabling, and related power equipment from the chassis. The present invention exhibits a low unit weight to pulling/pushing power ratio, and a low unit weight to load capacity ratio.

52 Claims, 15 Drawing Sheets

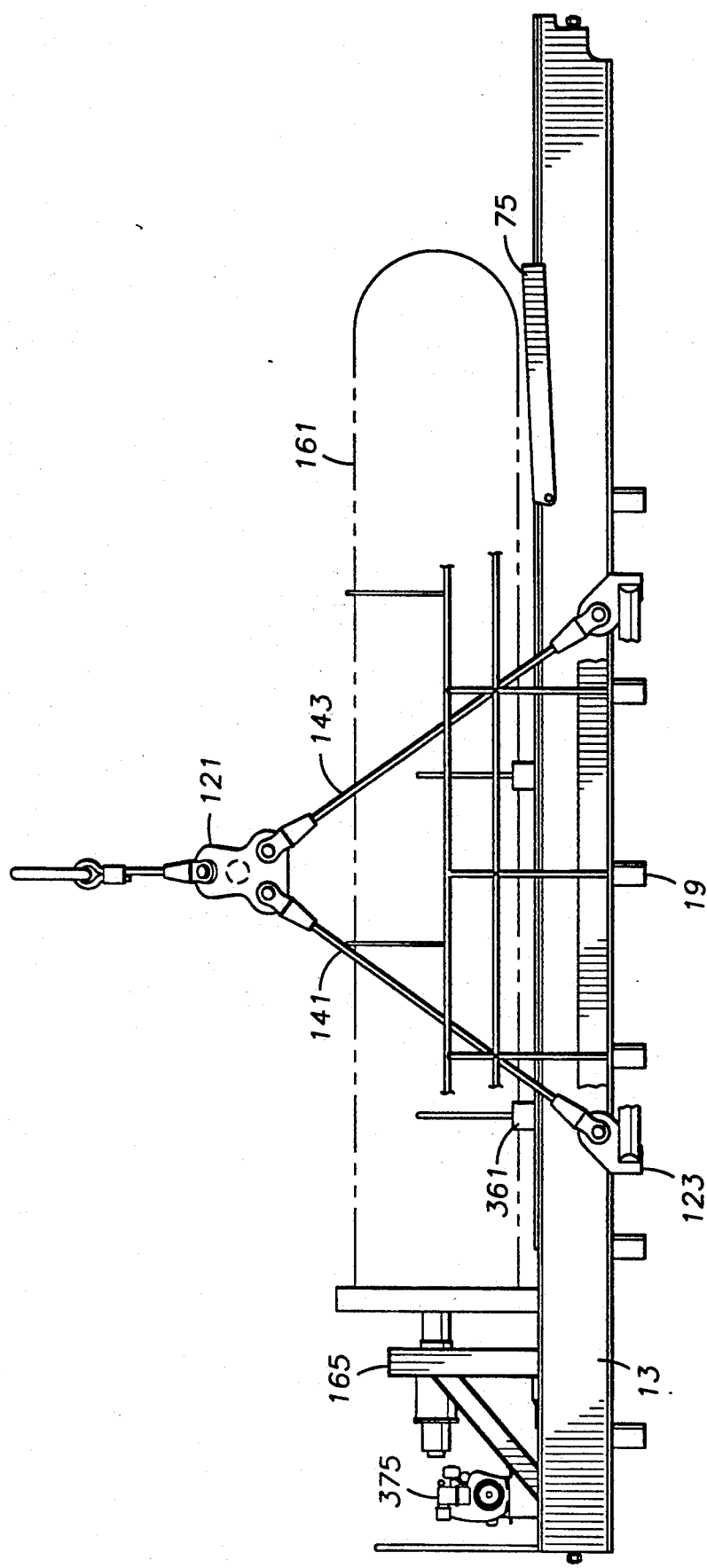

TUBE BUNDLE EXTRACTOR

BACKGROUND OF THE INVENTION

The present invention relates generally to the field of heat exchanger tube bundle extractors, and more particularly to an aerial heat exchanger tube bundle extractor having an improved carriage or sled and motive means which are operable to move the tube bundle into or out of the heat exchanger shell.

Heat exchangers, such as are commonly employed in process plants or the like, typically comprise a cylindrical shell inside of which is disposed a bundle of elongate tubes. The shell may be twenty feet or more in length, and the tube bundle may weigh twenty tons or more. A circular plate known as a tube sheet is typically disposed on at least one end of the tube bundle. The tube sheet usually has a plurality of holes extending axially therethrough, and the open ends of the tubes will be affixed to the tube sheet so that each tube end is in fluid communication with one of the holes. Sometimes the tubes will be U-shaped, in which case each tube has two ends affixed to the tube sheet. In this arrangement, only one tube sheet need be employed. The tubes may instead be straight, and affixed to a tube sheet disposed at each end of the bundle. In either case, the tube sheet(s) is connected to other fluid flow apparatus such that fluids may be circulated through the tubes, into and out of the heat exchanger. Other fluids are caused to flow around the tubes inside the heat exchanger shell, thereby facilitating the heat exchange process between the fluids flowing through the tubes and those flowing through the shell.

The tubes and shell of the heat exchanger are subject to corrosion, deposition of mineral deposits and other build-up of foreign matter, both in and around the tubes and on the inside walls of the shell. These deposits need to be removed on a regular basis, because they interfere with the heat exchange process and reduce the efficiency of the heat exchanger. In order to effectively remove the deposits, the tube bundle must first be removed from the shell, so that all exterior surfaces of the tubes, and all the inside surfaces of the shell, are accessible in the cleaning operation. Once removed, the tube bundle may be cleaned at the plant site in special equipment transported on-site for that purpose, or transported to a remote cleaning facility. The shell, which may be located several stories above the ground, is typically cleaned in place.

Removal and reinstallation of tube bundles for cleaning or for other purposes (e.g., repair or replacement) are typically accomplished with a tube bundle extractor having an elongate chassis for supporting a tube bundle when removed, a means for engaging the tube bundle, and a means for alternately applying a pulling force or a pushing force to the tube bundle to withdraw the tube from, or to insert the tube bundle back into, the shell. The extractor will also include a means for engaging the shell or other fixed structure for carrying reaction forces arising during the bundle pulling or pushing operations.

One approach used in the past toward creating the relatively high pushing and pulling forces required for moving a tube bundle includes providing one or more rotatable drive screws extending longitudinally through most of the length of the chassis, in engagement with one or more nuts fixedly disposed on a movable sled. The sled will be adapted for movement on the chassis, such as by sliding or rolling along a track, so that when the drive screw is rotated one way or the other, the sled is caused to advance or retreat, as the case may be, along the chassis. The sled will be engaged with the tube bundle so that movement of the sled along the chassis caused by rotation of the drive screw pulls the tube bundle from, or pushes it into, the shell. See, e.g., U.S. Pat. No. 4,869,638, issued Sep. 26, 1989, to Krajicek et al. Another approach used in the past in tube bundle removal and replacement includes providing a rotatable pinion on the sled in engagement with a fixed rack on the chassis. See, e.g., U.S. Pat. No. 4,392,524, issued Jul. 12, 1983, to Bauch.

In prior art arrangements such as those disclosed in the Krajicek and Bauch patents, at least some of the equipment comprising the prime mover or power source, and/or the power conversion apparatus, and/or the power transmission apparatus is disposed on the chassis of the extractor, while other components of such power systems such as hydraulic motors, hydraulic cylinders, or the like are disposed on the sled. Because the sled of an extractor is movable with respect to the chassis, this usually requires that a sometimes complex system of cabling, piping, hoses, and the like be provided for communicating between chassis and sled so that all powered systems remain operative as the sled traverses the chassis. In other words, usually the sled must be continuously connected to the chassis by often complex, often bothersome or in-the-way 'umbilical lines' in order to ensure that all powered systems are properly supplied at all times with needed hydraulic fluid or the like. When flexible hoses, such as rubber hoses or the like, are used for such 'tethering' operations, they will have to be maintained and/or repaired from time to time, and eventually replaced; this of course increases operating costs.

In U.S. Pat. No. 3,836,015, issued Sep. 17, 1974, to Travis, there is disclosed the use of a fixed chain on the chassis engaged by a sprocket on a rotating shaft of a rotary motor on the sled to enable the sled to walk along the chain; and the use of a fixed rack on the chassis engaged by a pinion on the sled, the pinion also being driven by a motor, M, on the sled. There is also disclosed a relatively larger hydraulic cylinder and piston mounted on the sled, referred to by the patentee as a prime mover and serving as a linear actuator, for applying a breakout force to the tube bundle and for moving the tube bundle initially along the chassis. However, the nature and location of the power generation, conversion, and control equipment for powering and operating the rotary motors, and the linear actuator hydraulic cylinder, are not disclosed in the Travis patent.

U.S. Pat. No. 3,490,609, issued Jan. 20, 1970, to Poole, and U.S. Pat. No. 2,650,728, issued Sep. 1, 1953, to Goodwyn, disclose use of an internally threaded rotating nut or gear within which is disposed a threaded rod for the purpose of causing longitudinal movement of the rod. The Poole patent uses the moving rod to actuate the ram head of a pipe laying sled, and the Goodwyn patent uses the moving rod to adjust the bumper lugs of a transfer bar of an automobile storage apparatus.

Other examples of tube bundle extractors are shown, for example, in U.S. Pat. No. 4,358,242, issued Nov. 9, 1982, to Davies, and U.S. Pat. No. 3,567,044, issued Mar. 2, 1971, to Travis.

SUMMARY OF THE INVENTION

In the present invention, according to a preferred embodiment, instead of a rotatable drive screw disposed on the chassis and a fixed nut disposed on the sled, a fixed screw shaft is provided on the chassis and a rotatable drive nut is disposed on the sled. The fixed screw shaft passes through the center of the drive nut, which is threadedly retained on the fixed screw shaft. The drive nut is held against axial movement with respect to the sled by a gear box disposed on the sled. The output of the gear box includes a rotating shaft to which the drive nut is connected, which provides the drive nut with the appropriate speed and power to effectively pull the tube bundle from, or push the tube bundle back into, the shell. Rotation of the drive nut in one direction or the other (i.e., clockwise or counterclockwise), through rotation of the output shaft from the gear box, i.e., the drive shaft, causes the drive nut to advance or retreat along the fixed screw shaft. Since the drive nut is mounted on the sled and prevented from moving axially with respect to it, movement of the drive nut along the fixed screw shaft causes the sled to move along the chassis. Since the sled is engaged with the tube bundle, movement of the sled causes the tube bundle to be either pulled from or pushed into the shell. A balance nut disposed on the opposite end of the drive shaft from the drive nut, and threadedly engaged with the fixed screw shaft, reacts against side forces acting on the sled and screw shaft to assist in keeping the drive nut and screw shaft properly aligned. This in turn helps prevent the drive nut from jamming or becoming stuck on the screw shaft, and helps to assure smooth operation of the sled drive means. While the drive nut must be able to carry or withstand the full range of forces expected in service, such as the dynamic forces experienced in pushing or pulling the tube bundle, the balance nut need only be capable of carrying side loads, such as gravity forces on the screw shaft. According to an alternative embodiment of the invention, instead of a fixed screw shaft on the chassis and a rotatable drive nut on the sled, the locomotive movement of the sled along the chassis may be effected through, for example, a rack and pinion arrangement whereby a fixed rack is longitudinally disposed along the chassis, and a rotatable pinion is disposed on the sled, in engagement with the rack; rotation of the pinion causes it, and the attached sled, to traverse the rack. Alternatively, a ratcheting or telescoping cylinder could be disposed on the sled, whereby the cylinder successively extends and retracts, engaging and disengaging from the chassis, which moves the sled in increments along the chassis. Other movable means, disposed on the sled, of powering the sled along a fixed chassis structure will no doubt become apparent to persons of ordinary skill in the art upon referring to the present specification and drawings.

The present invention has an advantage over prior art systems and methods in that all of the power generation, conversion, and control equipment for operating the sled drive means and the associated powered tube bundle handling equipment, i.e., a hydraulic breakout cylinder and a hydraulic elevator, is located on the sled itself in a compact and self-contained arrangement, and is movable along with the sled. This eliminates the piping, cabling, and related power equipment from the chassis, which in prior art systems is usually relatively complicated and cumbersome. This also eliminates the need for keeping the sled 'tethered' to a power source located on the chassis, or external to the extractor, which in turn eliminates most of the need for flexible hoses and the like from the extractor. As will be noted in the following detailed description, there will still be a minimal requirement for flexible hoses, such as will extend from the hydraulic fluid source to the breakout cylinder.

Thus, the present invention substantially streamlines and simplifies the overall design of the extractor, thereby enabling it to be more easily and inexpensively manufactured. The simplified, streamlined design of the present invention also exhibits a low unit weight to pulling/pushing power ratio, and a low unit weight to load capacity ratio.

These and other objects and advantages of the invention will become apparent from the following description of the preferred embodiment when read in conjunction with reference to the following drawings, wherein:

BRIEF DESCRIPTION OF THE DRAWINGS

FIG. 13 is a view similar to FIG. 11, showing a tube bundle balanced on the chassis of the extractor of the present invention and ready to be raised to the heat exchanger shell for reinsertion, or lowered to the ground for removal to a cleaning facility.

Figure 1A:
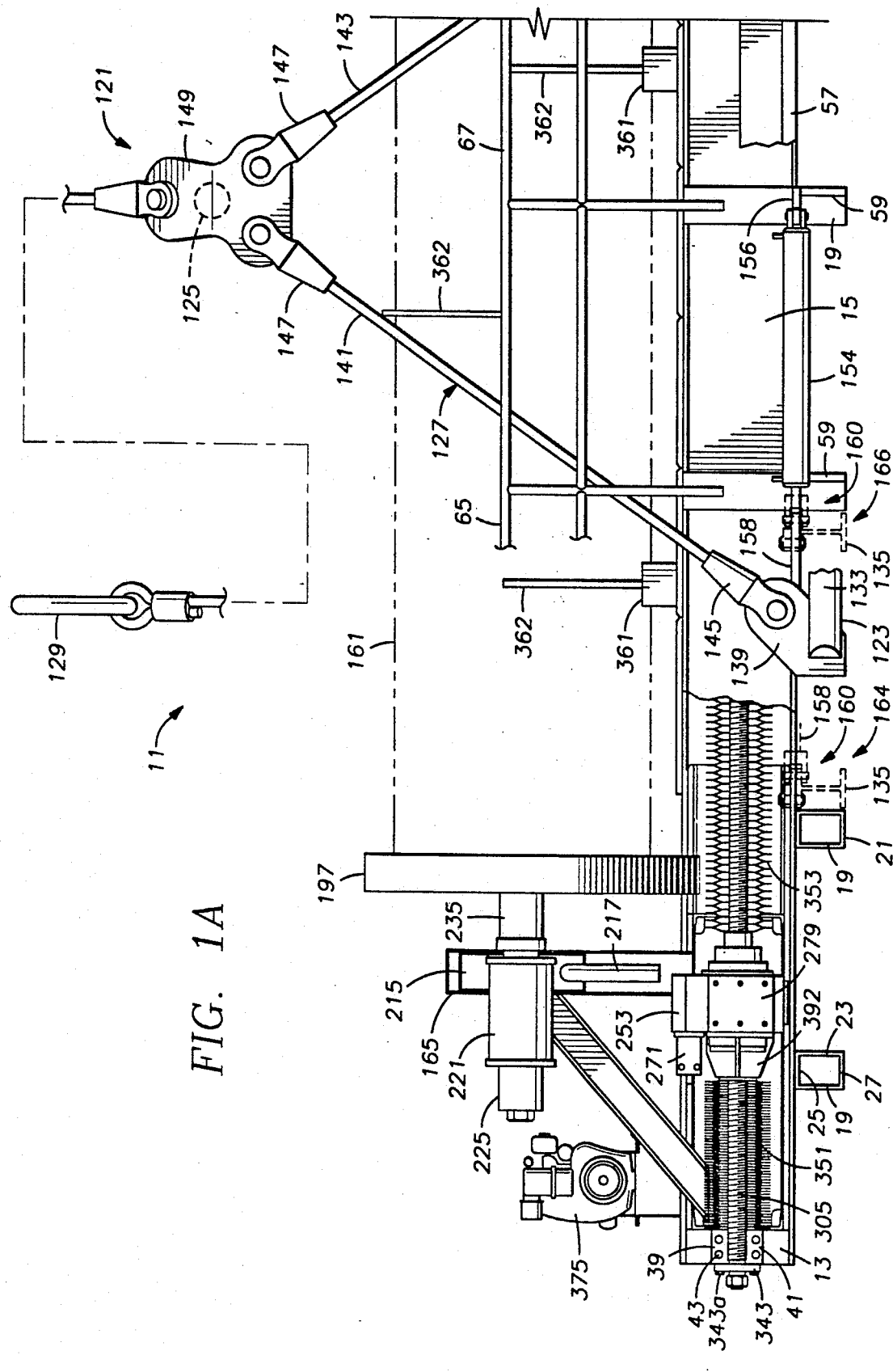
FIGS. 1A and 1B comprise a side elevational view, partly schematic, partly in vertical section and with some parts broken away, of an aerial heat exchanger tube bundle extractor of the present invention in position adjacent a heat exchanger shell, with a tube bundle disposed on the chassis and showing the movable sled of the present invention in both an inboard and an outboard position, FIG. 1A showing the inboard end of the apparatus and FIG. 1B showing the outboard end.
Figure 1B:
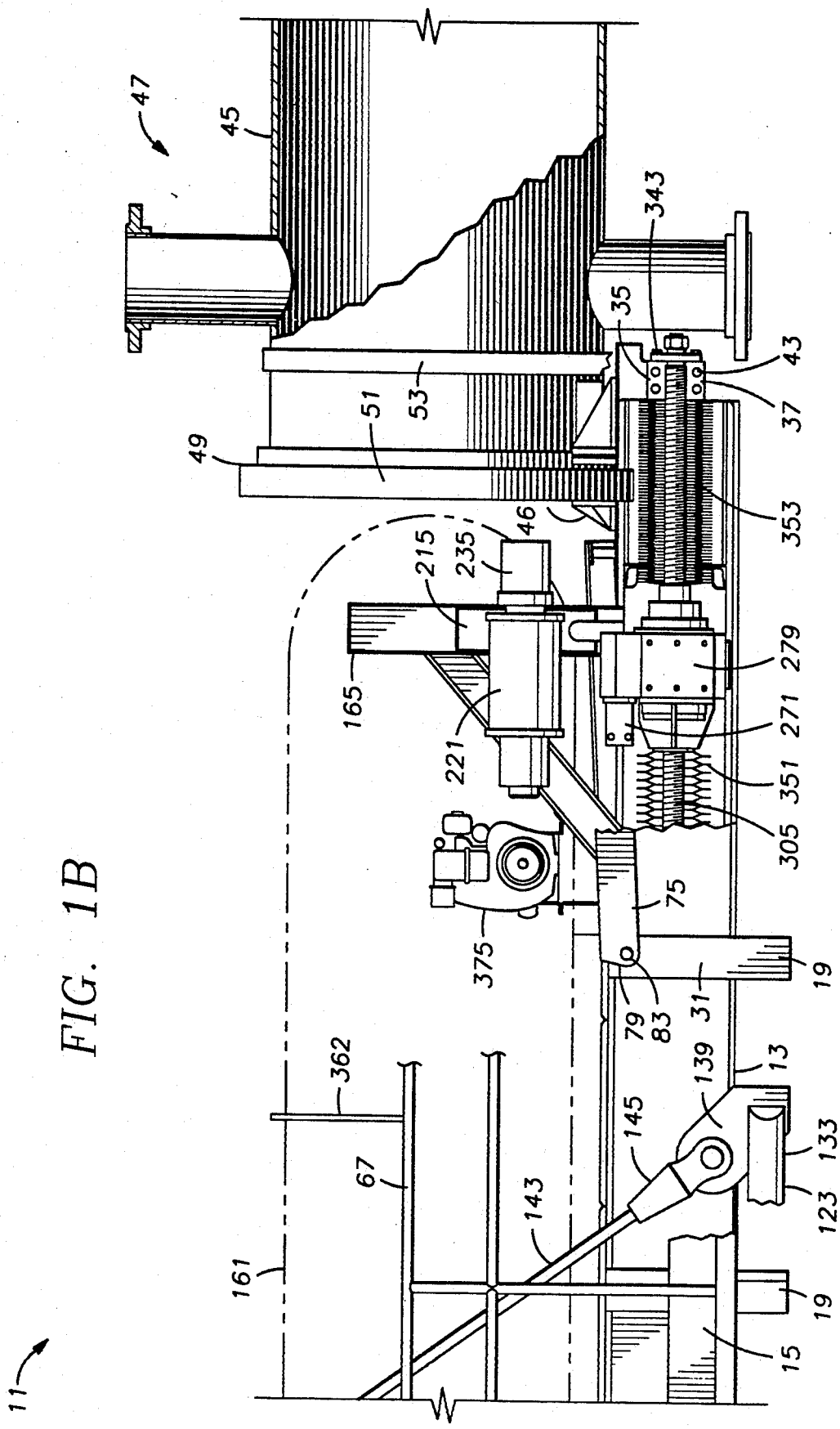
Figure 2:
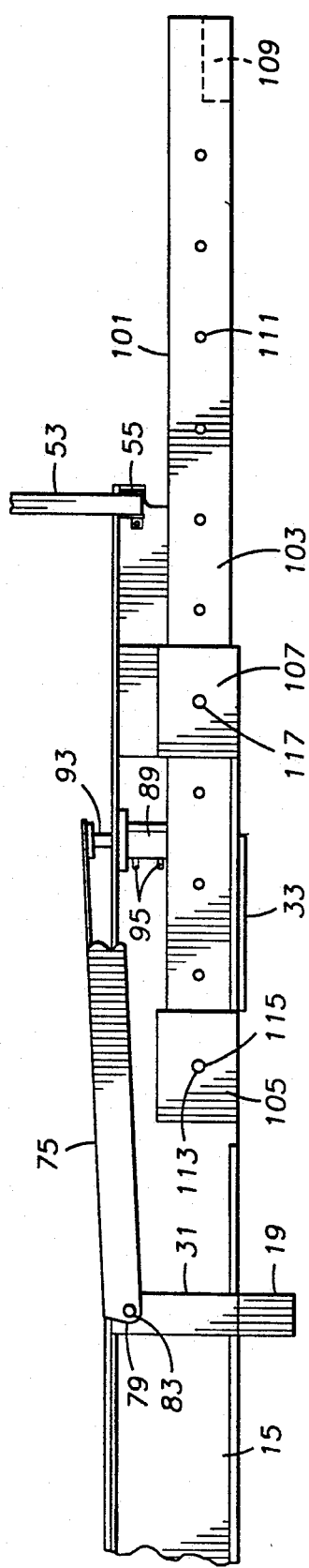
FIG. 2 is an enlarged side elevational view of the outboard end of the extractor of FIGS. 1A and 1B, showing the elevator ramps of the invention in a raised position, and the chassis extension section in place.
Figure 3A:
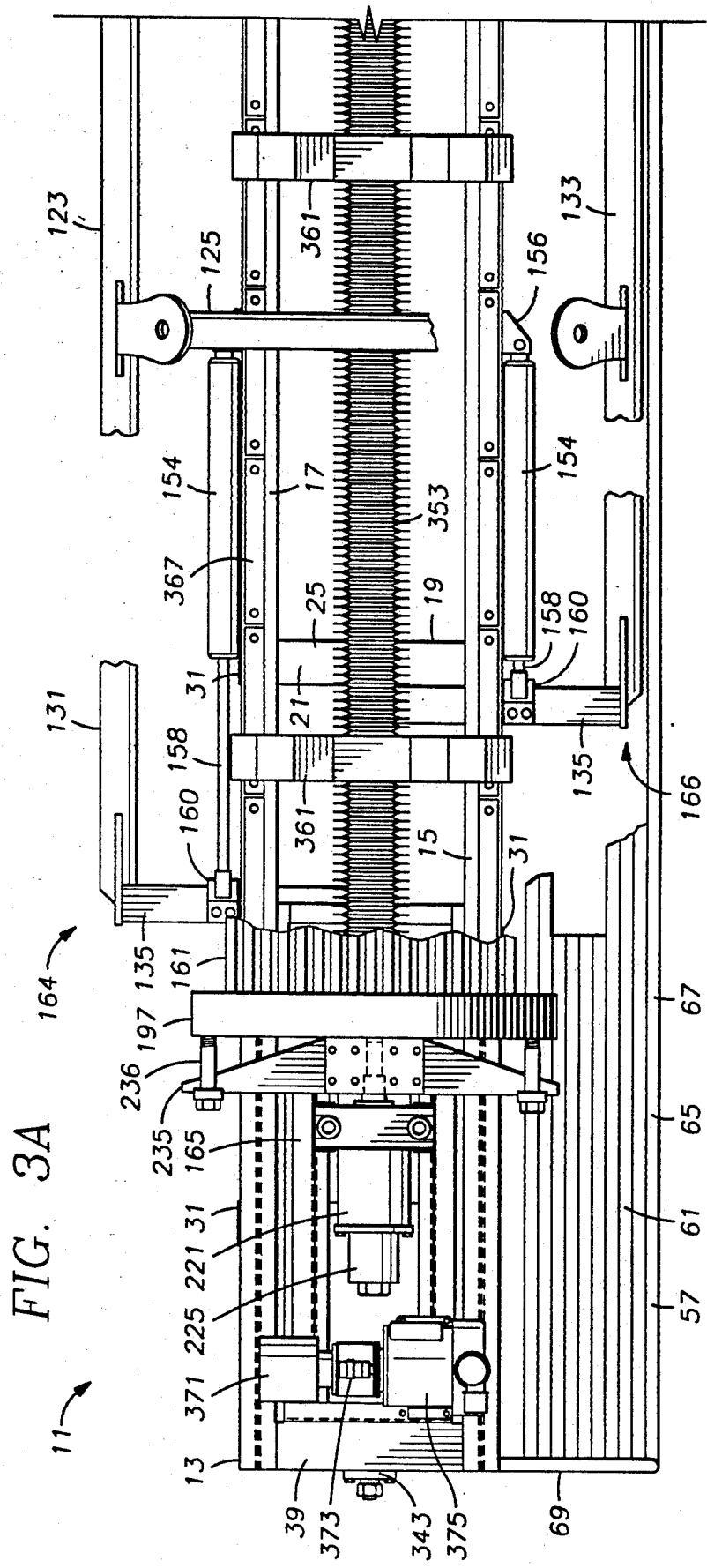
FIGS. 3A and 3B comprise a top plan view of the extractor of FIGS. 1A and 1B, with some parts broken away, showing the tube bundle on the chassis in fragmentary form and showing the sled in an inboard position, FIG. 3A showing the inboard end of the apparatus and FIG. 3B showing the outboard end.
Figure 3B:
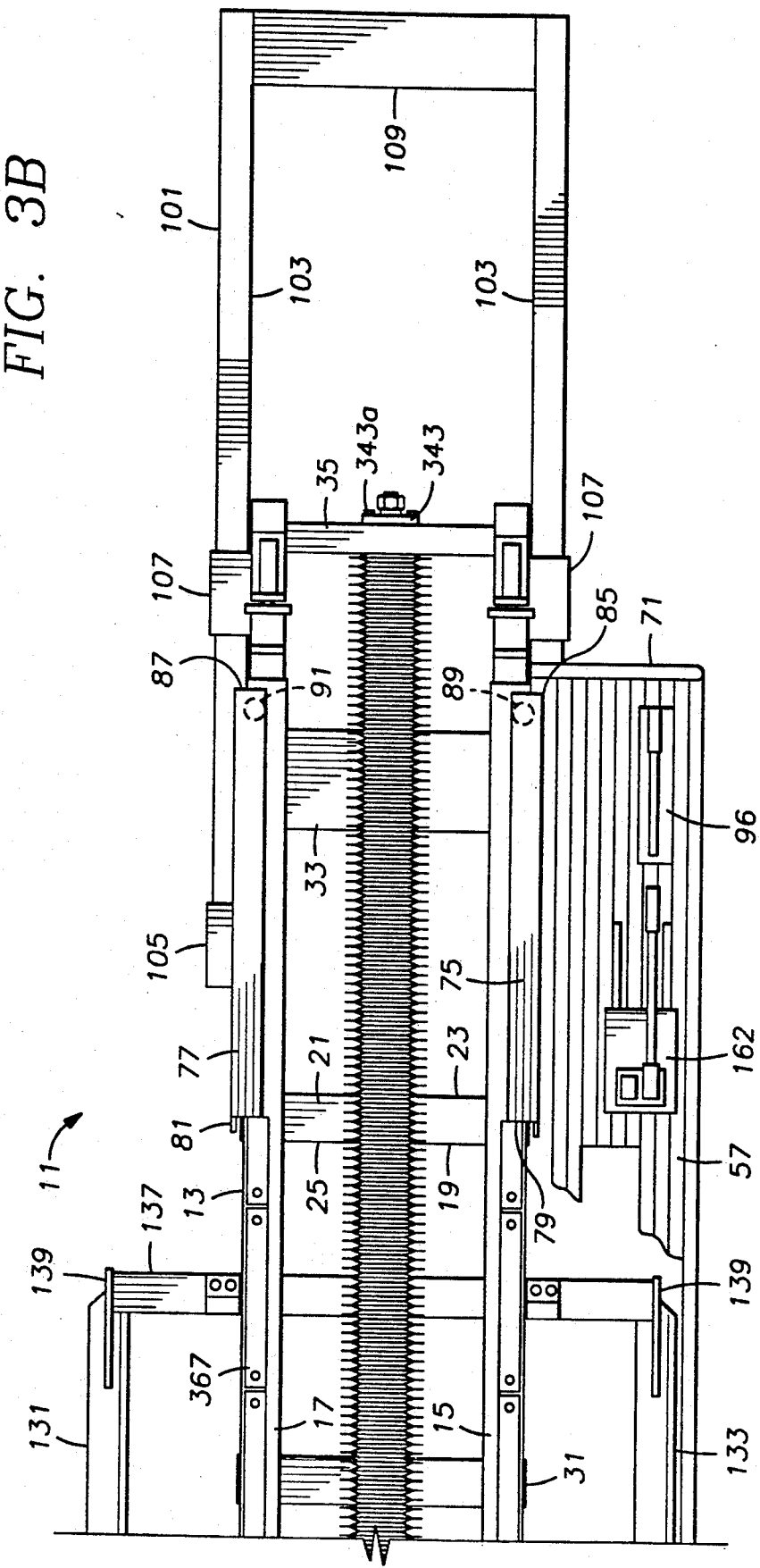

For simplicity, FIGS. 1A and 1B will be referred to collectively in the following description as "FIG. 1," and FIGS. 3A and 3B will be referred to collectively as "FIG. 3."

DETAILED DESCRIPTION OF THE PREFERRED EMBODIMENTS OF THE INVENTION

Referring to the attached drawings, and initially to FIGS. 1–5, the heat exchanger tube bundle extractor of the present invention is indicated generally at 11 and includes an elongate chassis 13 comprising a pair of primary structural support members 15, 17. Primary structural support members 15, 17 are preferably substantially parallel and transversely spaced apart, and are of substantially the same length. Members 15, 17 are disposed such that their inboard and outboard ends are substantially flush with one another. The term "outboard" as used in this specification means a direction toward the end of extractor 11 which engages the heat exchanger shell, and the term "inboard" means a direction toward the opposite end of the extractor. Members 15, 17 are preferably made of a material which is relatively strong as compared to its weight, such as steel or equivalent material, so as to reduce the weight of the extractor while maintaining its structural integrity. Members 15, 17 may take the form of, for example, upright I-beams or the like. The term "upright" is used herein to indicate that the bodies of the beams are vertically disposed. The I-beam configuration for members 15, 17 is preferred for the present invention, and the description which follows will assume that I-beams are employed.

Figure 4:
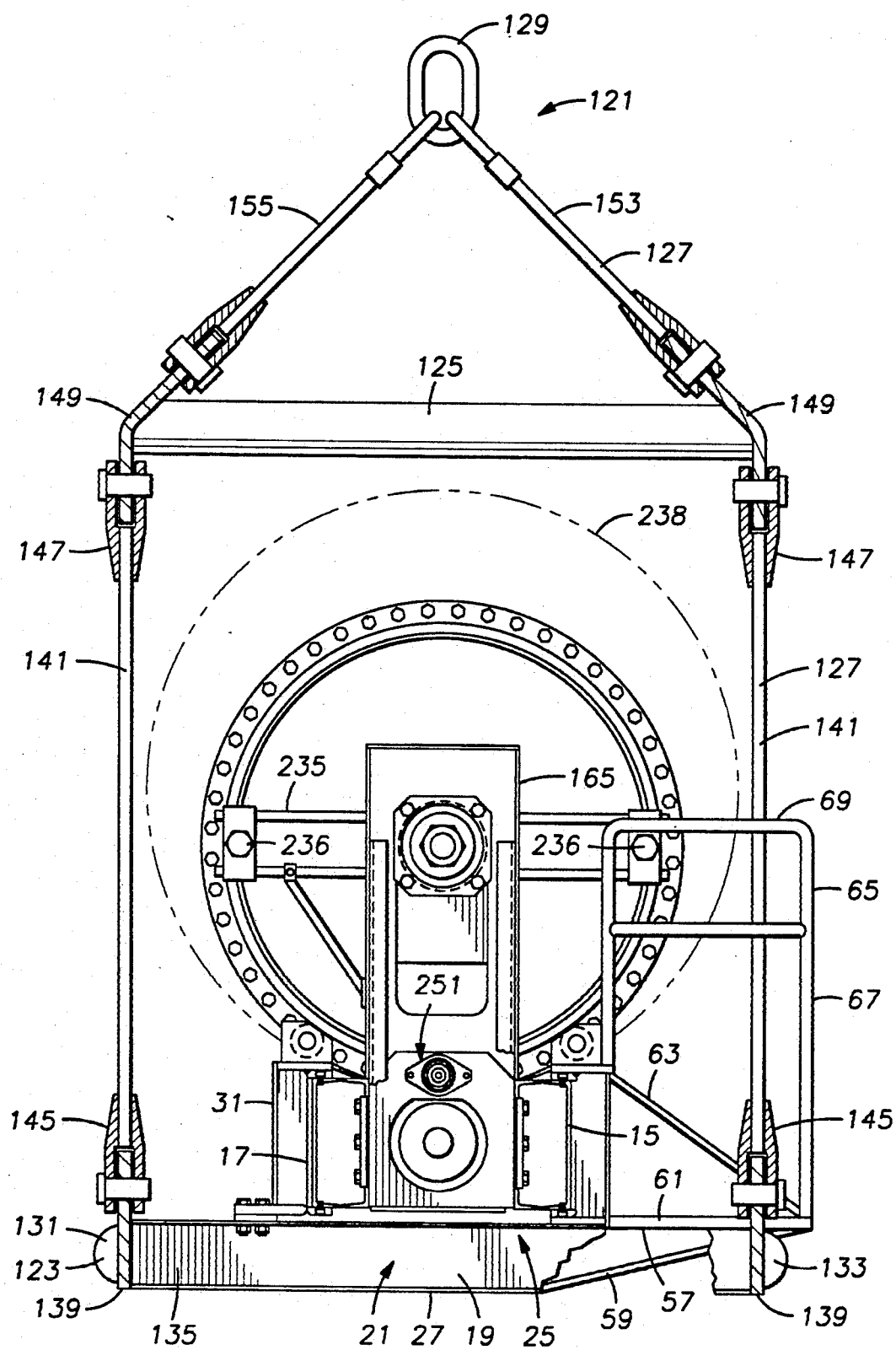
FIG. 4 is an end view of the extractor of FIGS. 1A and 1B with a tube bundle disposed on the chassis, with some parts broken away.
Figure 5:
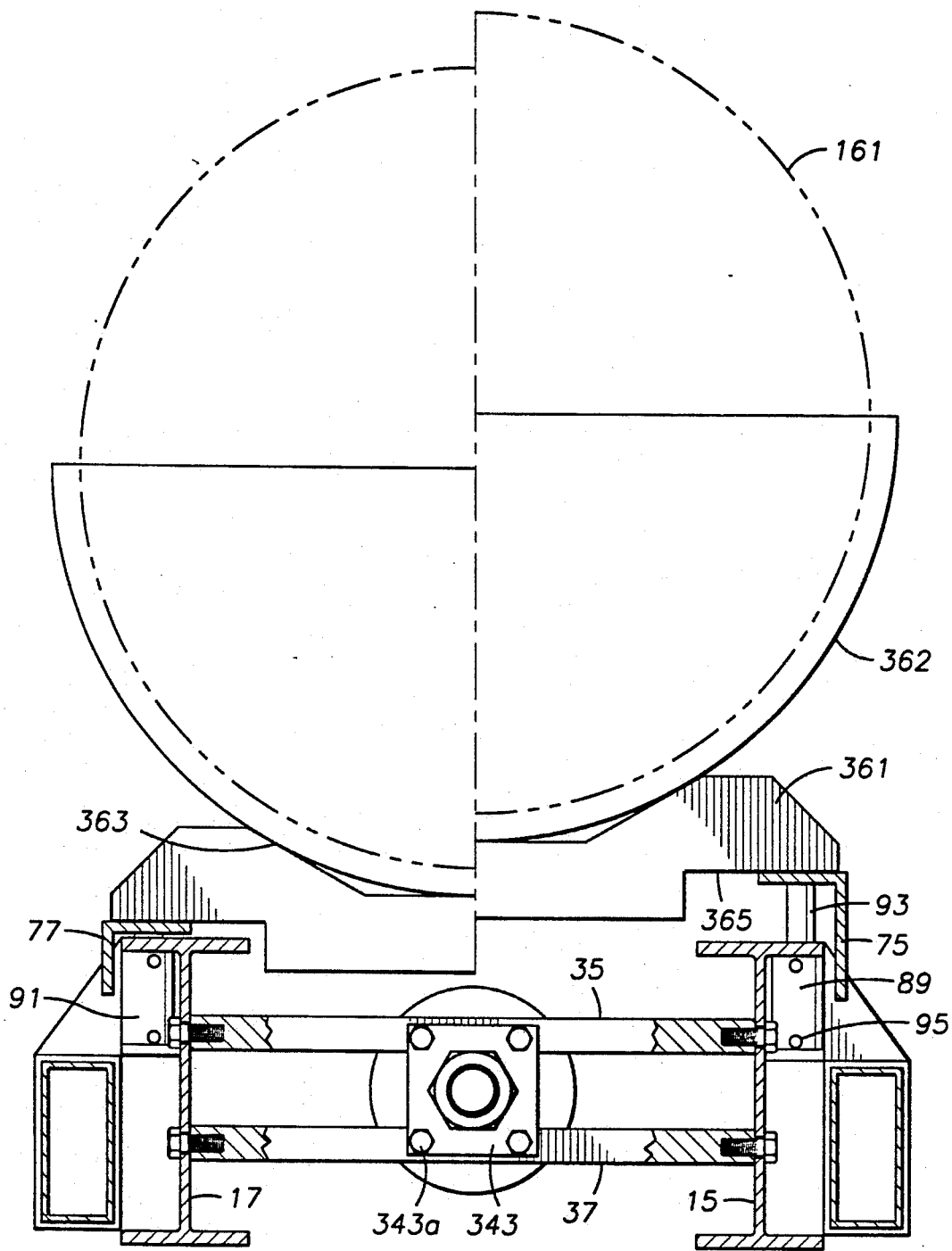
FIG. 5 is a transverse cross sectional view, partly schematic, of the extractor of FIGS. 1A and 1B with a tube bundle disposed on the chassis and showing the elevator ramps of the extractor in both a raised and a lowered position.

The chassis 13 also includes a plurality of transversely extending, longitudinally spaced apart lower braces 19 connected between the I-beams 15, 17 to the lower faces of their bottom flanges. Lower braces 19 are preferably substantially perpendicular to the members 15, 17, and preferably are constructed in the form of a metal tube having a rectangular profile in transverse cross section. As in the case of members 15, 17, braces 19 may be constructed of steel or the like. As shown in FIGS. 1 and 4, braces 19 may be configured such that their sides 21 are substantially in the form of an inverted trapezoid, i.e., a trapezoid with the longer base uppermost, and their ends 23, tops 25 and bottoms 27 are substantially in the form of rectangles. Braces 19 are securely affixed to the undersides of members 15, 17, as by welding. By way of example only, and not by way of limitation, braces 19 may have an outer width of about six inches, an outer height of about eight inches, and a wall thickness of about one-quarter of an inch. Although six braces 19 are shown in the drawings, it should be understood that a greater or lesser number of braces could be used, so long as the desired structural integrity of chassis 13 is maintained.

All of the braces 19 preferably have affixed thereto on each of their ends an upwardly extending side brace or rib 31. Side braces 31 may be, for example, in the form of a flat plate, or they may be in the form of a rectangular tube similar to the lower braces 19. Side braces 31 may be affixed, as by welding, to the upper end edges of the lower braces 19 and to the web and/or flanges of the I-beams 15, 17. As in the case of I-beams 15, 17 and braces 19, ribs 31 may be constructed of steel or the like. As in the case of braces 19, although twelve ribs 31 are preferred, i.e., two for each brace, it should be understood that a greater or lesser number of ribs could be used, so long as the desired structural integrity of chassis 13 is maintained.

Ribs 31 and their respective lower braces 19 form substantially U-shaped structural support members for chassis 13. Braces 19 support the chassis 13 against torsion, for example, to keep the I-beams 15, 17 relatively coplanar with one another, and ribs 31 provide resistance to rotation or flexing of the tops of the I-beams, such as outward rotation which would tend to spread apart the upper ends of the "U" formed by braces 19 and ribs 31. Chassis 13 also includes a plate 33 connected between the I-beams 15, 17 to the lower faces of their bottom flanges near their outboard ends to help keep the inboard and outboard ends of the I-beams 15, 17 flush with one another.

Chassis 13 further includes upper and lower outboard end cross members 35, 37 and upper and lower inboard end cross members 39, 41 disposed between and affixed to I-beams 15, 17, as by bolts 43. Cross members 35, 37 and 39, 41, in addition to providing structural support for the chassis 13, act as outboard and inboard travel stops, respectively, for the movable carriage or locomotive 165 as more fully described below. Cross members 35, 37 and 39, 41 also serve to support the outboard and inboard ends, respectively, of the fixed screw shaft 305, also as more fully described below.

Near the outboard end of the extractor 11, chassis 13 is provided with a cradle 46 for engaging the shell 45 of heat exchanger 47 for the purpose of providing reaction points for various of the lifting, pushing, and pulling forces encountered in service. The chassis cradle 46 preferably engages the front and back surfaces of lip 49 of annular flange 51 of shell 45, and may also engage the underside of the shell. In addition, extractor 11 is provided with an adjustable tie-down loop means 53, such as a wire cable or a sling or strap of plastic webbing or the like, or encircling the body of shell 45 behind flange 51 and releasably securing the extractor to the shell. A tightening means 55 (see FIG. 2), such as a ratcheting device or the like, is disposed on at least one end of the tie-down loop 53 for tightening the noose formed thereby. When tie-down loop 53 is placed around shell 45 and tightening means 55 is actuated, the extractor 11 will be securely, releasably mounted on the shell, with the chassis cradle 46 making the initial contact between the chassis and the shell.

A work platform 57 is disposed on one side of extractor 11 for supporting a worker or workers who may be involved in the tube bundle extraction and/or replacement operations. Platform 57 preferably extends along most of the length of extractor 11, and is supported from one of the I-beams 15, 17. Lower platform support braces 59 extend from the outer edge of bed 61 of platform 57 to chassis braces 19, and upper platform support braces 63 extend from the outer edge of bed 61 to the top of the I-beam 15, 17 to which platform 57 is mounted. A safety railing 65, including side rails 67 and end rails 69, 71, assists in preventing workmen from accidentally falling off the platform 57 during use of extractor 11. Platform 57 is preferably made of a strong but relatively lightweight material such as fiberglass or plastic, or other suitable material. Railing 65 may also be made of fiberglass or plastic, but a metal pipe could also be used. To reduce weight, platform 57 may be made in the form of a meshwork, grating, or other suitable configuration.

Near the outboard end of extractor 11, chassis 13 is provided with a pair of elevator ramps 75, 77, each ramp preferably comprising an inverted L-shaped metal member. Ramps 75, 77 are disposed with the bases of the "L" atop the upper, outer faces of the upper flanges of the I-beams 15, 17. The legs of the "L" extend downwardly from the bases to the outside of and spaced apart from the bodies of the I-beams 15, 17. The inboard ends 79, 81 of ramps 75, 77 are rotatably pinned, as at 83 (FIG. 2), to the I-beams 15, 17 and the adjacent rib 31 such that their outboard ends 85, 87 are free to be raised to a limited extent above the upper surfaces of I-beams 15, 17. For example only, and not by way of limitation, the outboard ends 85, 87 of ramps 75, 77 may be adapted to be raised about four inches above the upper faces of the I-beams 15, 17. Hydraulically actuated rams 89, 91 (FIGS. 2 and 5) are mounted to the bodies of I-beams 15, 17 on their outside surfaces to enable the ramps 75, 77 to be easily raised and lowered. Rams 89, 91 have extension rods 93 which engage the undersides of the horizontal portions of the ramps 75, 77, that is, the bases of the "L" as referred to previously, through appropriate apertures in the I-beam flanges in order to raise or lower the outboard ends 85, 87 when rams 89, 91 are actuated. Actuation of rams 89, 91 may be effected through manual application, as by a hand pump or jack 96, of hydraulic fluid through ports 95 on the rams.

In order to increase the length of the chassis 13 when necessary or desired, a substantially U-shaped extension section 101 may be telescopingly mounted on the outboard end of the chassis. The two legs 103 of extension section 101 are preferably slidably disposed on the upper, outer faces of the lower flanges of the I-beams 15, 17, and are slidably received within and retained by a pair of sleeves 105, 107 of sheet metal or the like mounted on each of the I-beams. The outboard ends of the legs 103 of the extension section 101 are connected together by a transversely extending cross brace 109. Each of the legs 103 may be provided with a plurality of holes 111 extending along the center of the legs for receiving retaining pins 113 which are removably inserted in holes in sleeves 105 and/or 107, as shown, for example, at 115, 117, for retaining extension section 101 in the desired extended or relatively retracted position. For this reason, holes 111 are spaced apart a distance such that pins 113 will fit snugly when installed in any of a selected pair of holes, such as the holes shown at 115, 117. Preferably, legs 103 of extension section 101 are made in the form of rectangular metal tubes. By way of example only, and not by way of limitation, legs 103 may be of the order of ten feet in length, and may have a rectangular profile in transverse cross section of about four inches in outside width and ten inches in outside height. Legs 103 may, for example, have a wall thickness of the order of about 0.188 inches.

The chassis 13 is supported within, and longitudinally movable to a limited extent with respect to, a center-of-gravity sling 121. Sling 121 comprises a substantially rectangular-shaped lower frame 123 on which chassis 13 rests, a transversely extending spreader bar 125 disposed above the frame 123 at a distance such that it will clear the upper surface of the tube bundle being extracted or replaced, and a cabling system 127 for supporting the sling 121 from a ring 129 to be grasped and lifted by a crane or the like so that the chassis can be placed adjacent to the heat exchanger shell 45. Frame 123 includes a pair of longitudinally axially extending, preferably round tubular metal side members 131, 133 connected together at their opposite ends by a pair of cross members 135, 137, which preferably comprise I-beams. At each corner of frame 123, there is disposed a gusset 139 for attaching the lower end of one of a pair of cables 141, 143 disposed on each side of the sling. As shown in FIG. 1, the lower ends of cables 141, 143 are attached to gussets 139 through lower cable ends 145, and the upper ends of cables 141, 143 are attached through upper cable ends 147 to one of a pair of upper gussets 149 disposed at the ends of spreader bar 125. Upper cables 153, 155 are connected at their lower ends to upper gussets 149, and at their upper ends to support ring 129. Spreader bar 125 ensures that the cable pairs 141, 143 lie in a substantially vertical plane, as shown in FIG. 4. The various gussets ensure that the load carried by the sling 121 is properly centered and transmitted from frame 123 through the cabling system 127 and ultimately to ring 129 so as to avoid placing unwanted stresses, such as those caused by unnecessary torsional forces, in the sling components.

Sling 121 is longitudinally axially movable to a limited extent along the chassis 13 in order to balance the load carried by the sling, such load being primarily that resulting from carrying the tube bundle 161 on the chassis 13. Although not individually shown in the accompanying drawings, the tubes comprising the bundle 161 are mounted so that their free ends terminate in a tube sheet 197, according to conventional practice. Hydraulic cylinders 154 are preferably mounted between the chassis 13 and the lower frame 123 of sling 121 to move the frame with respect to the chassis. One end of each of the cylinders 154 is attached to the respective one of the I-beams 15, 17 as shown at 156, and extension rods 158 of cylinders 154 are attached to end beam 135 of frame 123 as shown at 160. Frame 123 of sling 121 may be moved along chassis 13 by extension or retraction of rods 158 of cylinders 154, by means such as a hand-operated hydraulic or mechanical jack 162 or other suitable means. For example, in a preferred embodiment sling 121 may be moved a distance of about 18 inches along chassis 13 in either direction, resulting in a difference of about three feet in placement of the sling with respect to the chassis from the extreme inboard placement to the extreme outboard placement. Such a difference in possible placement of the sling 121 with respect to the chassis 13 will accommodate the necessary extremes of off-balance weight placement of the loads expected to be encountered in service, such as that due to a tube bundle 161 of varying size or shape. The inboard and outboard limits of the possible sling placement on the chassis are illustrated in FIGS. 1 and 3 at 164 and 166, respectively.

Referring now to FIGS. 1-3 and 6-8, extractor 11 is provided with a carriage or sled 165 adapted for engagement with tube bundle 161 and for powered, longitudinal axial movement along the chassis 13 for pulling the tube bundle from the heat exchanger shell 45 and along chassis 13 in an inboard direction during the tube bundle removal operation, and for pushing the tube bundle along the chassis in an outboard direction and into the shell during the tube bundle replacement operation. Sled 165 is also adapted for applying an increased, initial breakout or pulling force on the tube bundle if necessary to break the tube bundle away from the heat exchanger shell in the event the tube bundle has become stuck in the shell, as by corrosion or deposition of hardened deposits or the like between the tube bundle and shell. Sled 165 carries its own fuel storage and conversion means, and all of its own power conversion and control equipment to enable it to traverse the chassis 13 from its inboard end to its outboard end, without the need for application or conversion of power from a source external to the sled. Sled 165 is a self-contained power source for pulling and pushing tube bundles, including the prime mover for these operations. For this reason, carriage or sled 165 may be referred to as a locomotive unit.

Sled 165 includes a lower frame 167 adapted for sliding, longitudinal axial movement along the chassis 13 between the I-beams 15, 17. Frame 167 includes a pair of longitudinally axially extending, transversely spaced apart inner side beams 169, 171, and a pair of longitudinally axially extending, transversely spaced apart outer side beams 173, 175. A transversely extending cross beam 177 is disposed between the outer side beams 173, 175 at the inboard end 179 of sled 165, and a second transversely extending cross beam 181 is disposed between the outer side beams 173, 175 and spaced a substantial distance from their outboard ends. Inner side beams 169, 171, outer side beams 173, 175, and cross beams 177, 181 are preferably in the form of channel beams having an upright C-shaped profile in transverse cross section. Inner beams 169, 177 are preferably disposed with their flanges extending outwardly, and outer beams 173, 175 are preferably disposed with their flanges extending inwardly, toward the flanges of the inner beams (see FIG. 8). Beams 169, 173 are preferably disposed with their flanges closely adjacent one another, and beams 171, 175 are preferably disposed with their flanges spaced a small distance from one another, as shown at 172 in FIG. 7. Cross beams 177, 181 are preferably disposed with their flanges extending inwardly, toward the interior of the frame 167 and toward one another (see FIG. 6). Beams 169, 171, 173, and 175 are all connected, as by welding, to the cross beams 177, 181.

Strips 185 of friction-reducing material are mounted on the outer side beams 173, 175 on the upper faces of the upper flanges, and on the lower faces of the lower flanges, as by cap screws 174. Strips 185 are substantially flush with the inboard and outboard ends of the beams 173, 175, and extend along the entire length of the beams. Strips 185 preferably have beveled outer side and end edges 176. Strips 185 are preferably made of a tough, durable material which will be capable of withstanding the substantial forces to which the strips will be subjected, and which will provide a lubricious surface for reducing the friction of the sled with respect to the chassis as the sled slides back and forth in the chassis during service. Rub strips 185 are preferably made of brass or other suitable metal, but another material which may be found suitable for the rub strips is molybdenum-disulfide impregnated polytetrafluoroethylene ("PTFE"). Other materials will no doubt be found suitable by persons skilled in the art. Side beams 173, 175 are provided with circular apertures 191 in their main bodies between their upper and lower flanges, in order to reduce the weight of the locomotive 165 and to provide an operator with side access to its interior parts.

Sled or locomotive 165 also includes an upper frame 193 in which is disposed a breakout cylinder 195 for engaging the tube sheet 197 of tube bundle 161 and for applying an initial breakout force to the tube bundle if necessary. Frame 193 also houses an elevator 199 for raising or lowering the tube bundle engagement means 235 if necessary in order properly to grasp the tube bundle, and for raising and lowering the inboard end of the tube bundle a limited extent if necessary to assist in the tube bundle breakout, pulling, and/or pushing operations.

Upper frame 193 includes upwardly extending channels 201, 203 formed between side plates 206, 212 and inboard and outboard end plates 208, 210, respectively. End plates 208, 210 are affixed to side plates 206, 212, as by welding. Plates 206, 212 and 208, 210 are mounted on the inner side beams 169, 171 such that the channels face inwardly of the sled and toward one another. A cap plate 205 is disposed on the upper terminal ends of the plates 206, 212 and 208, 210 and affixed thereto, as by welding. Side plates 206, 212 include brace mounting extensions 207, 209 protruding in an inboard direction, to which are mounted the upper ends of a pair of diagonally extending braces 211, 213. The lower ends of braces 211, 213 are mounted on the inner faces of the webs of inner side beams 169, 171. Braces 211, 213 may be, for example, substantially C-shaped in transverse cross section.

Elevator 199 includes a body 215 which is disposed in and vertically slidable within the space defined between the channels 201, 203 and below the cap plate 205. Elevator 199 also includes a pair of lift cylinders 217 disposed on opposite sides of the body 215 and in engagement therewith for raising and lowering the body when activated, as by application of hydraulic pressure to, or withdrawal of such pressure from, the cylinders. Elevator 199 is preferably actuated through a hand-operated hydraulic pump or the like.

Breakout cylinder 195 includes a double-acting cylinder 221 mounted within an aperture in the inboard face of body 215 of elevator 199, a rod 223 disposed within the cylinder 221 and extending from the inboard and outboard ends of the cylinder, and a piston 225 mounted on and surrounding the rod 223 with its outboard end disposed within the cylinder and its inboard end extending from the cylinder. Rod 223 includes an enlarged head 227 on its inboard end, in engagement with the inboard end of the piston 225. Piston 225 and rod 223 are adapted for limited, longitudinal, reciprocating movement together within the cylinder 221 upon the application of hydraulic pressure to the opposite faces of piston 225 within cylinder 221. A retainer plate 229 is mounted to the elevator body 215, as by bolts 231, in engagement with the inboard end face of cylinder 221 for mounting the cylinder to the elevator 199. A tubular cylindrical bushing 233, comprising a mounting bushing and bearing for the reciprocating rod 223, is disposed near the center of the outboard face of body 215 of elevator 199, through which rod 223 extends. At the outboard end of rod 223 there is disposed a pull beam 235 adapted for attachment to the tube sheet 197 of tube bundle 161. Beam 235 is affixed to the rod 223 and adapted for longitudinal axial movement therewith. When the beam 235 is mounted to the tube sheet 197, as by bolts 236, the inboard end of the tube bundle 161 can be lifted or lowered a limited amount, if necessary, as the elevator 199 is raised or lowered, respectively, by lift cylinders 217. Additionally, the elevator 199 can be actuated to raise or lower the beam 235 a limited amount if necessary prior to attaching the beam to the tube sheet 197, so that the apparatus of the present invention can accommodate tube bundles of varying diameters and be properly aligned with and affixed to the tube sheets for effective, efficient pulling and pushing of the tube bundles. The maximum diameter of tube sheet which the extractor of the present invention can accommodate is illustrated at 238 in FIG. 4, which may be, for example, about 72 inches. Additionally, a removable restraining member 240 may be used in combination with the vertical motion of elevator 199 to cause rotation of beam 235 about the axis of cylinder 221 to rotatably align the tube sheet 197 for insertion of the tube bundle 161 into shell 45.

The piston 225 is double-acting within cylinder 221, being sealed within the cylinder and adapted for longitudinal axial movement therewithin through, for example, application of hydraulic pressure to the opposite faces of the piston 225 as indicated previously. Piston 225 has an enlarged flange portion 241 which is sealed, as by O-rings or the like, against the inside walls of the cylinder 221, and a body portion 243 which extends through the cylinder and retainer plate in an inboard direction, and is also sealed with respect to the cylinder by an O-ring or the like. When hydraulic pressure is applied to the inboard face of flange 241 the piston 225 is forced in an outboard direction. When hydraulic pressure is applied to the outboard face of flange 241, the unit comprising the piston 225, rod 223 and beam 235 is forced in an inboard direction. In the event a tube bundle which must be extracted has become stuck in the shell, the breakout cylinder unit 195 can be used to apply an initial force acting in a longitudinal axial direction to the stuck tube bundle in order to break the tube bundle away from the shell. Breakout cylinder 195 should preferably be able to exert a force of up to about 150,000 pounds or more on a stuck tube bundle in order to break it loose from the heat exchanger shell. The axis of breakout cylinder 195 is offset from the centerline between beams 173, 175 in similar fashion as the offset spacing, as shown at 172, of the beams 169, 171 between the beams 173, 175, as indicated at 242 in FIG. 7.

Figure 9:
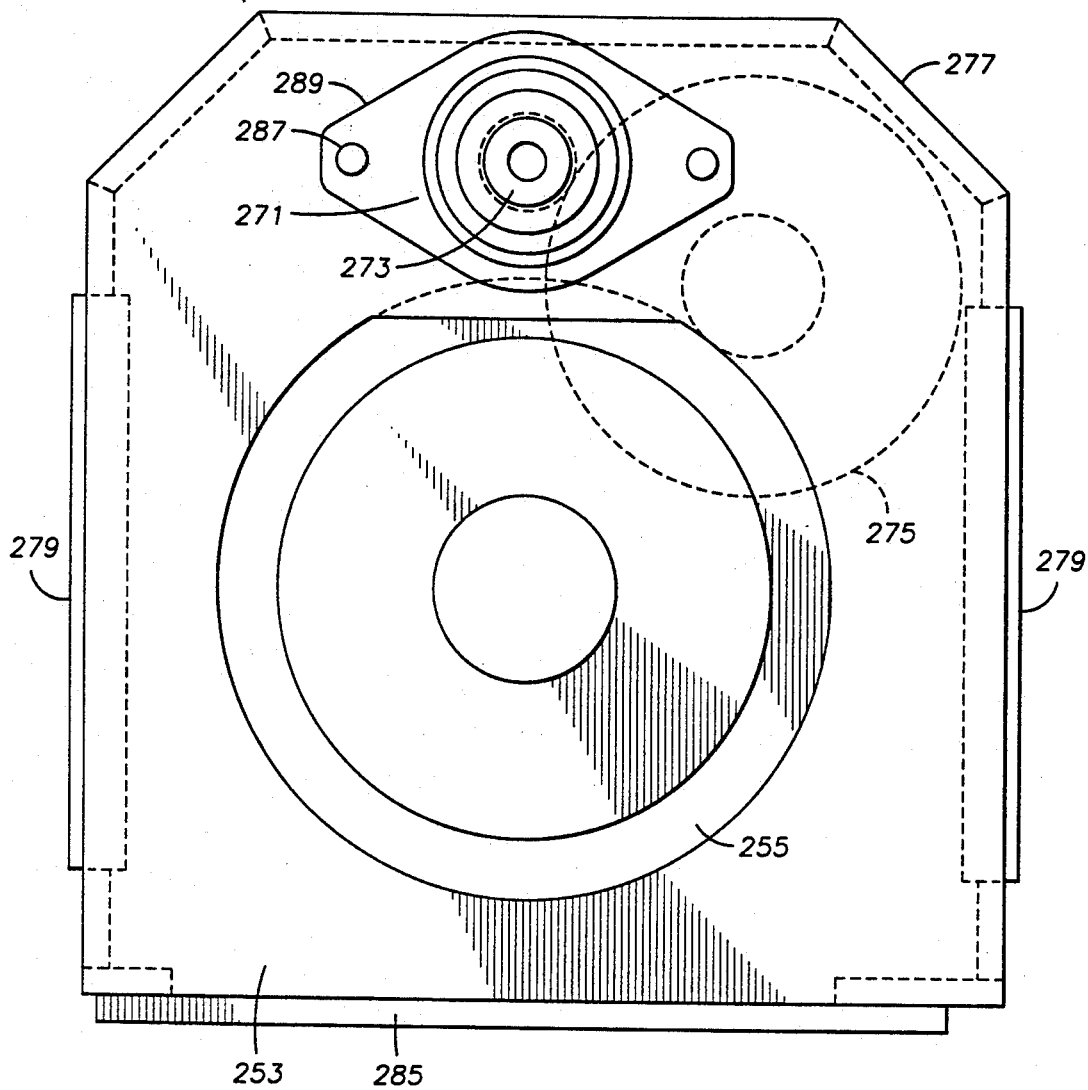
FIG. 9 is an enlarged end view of the gear box of the movable sled of the present invention.

The sled 165 also includes a drive means 251 for causing the sled to move longitudinally axially back and forth along the chassis 13. Referring additionally to FIG. 9 and to FIG. 10 where one embodiment of the drive means is shown, drive means 251 includes a gear box 253, an output gear 255 disposed within the gear box, an output shaft or drive shaft 257 mounted within the output gear, a drive nut carrier or flange 259 mounted to the outboard end of the drive shaft, and a drive nut 261 mounted to the outboard face of the drive nut carrier/flange. Drive means 251 also includes an output flange 263 mounted on the inboard end of the drive shaft 257, a balance nut carrier or flange 265 antirotationally connected to the output flange 263, and a balance nut 267 mounted to the inboard face of the balance nut carrier/flange. Drive means 251 also includes a motor 271 disposed in the upper portion of the gear box 253, the motor having a splined motor output shaft which engages and rotates a drive gear 273, and an intermediate gear 275 which meshes with both drive gear 273 and output gear 255.

Gear box 253 includes a metal housing 277 mounted to the inner side beams 169, 171 of sled 165 through a pair of mounting plates 279 disposed on opposite sides of the housing. A plurality of bolts 283 are disposed through the mounting plates 279, 281 and the side beams 169, 171 for securing the housing 277 in place. There are preferably six (6) such bolts 283 on each side of the housing 277. A bottom plate 285 is bolted to the bottom edges of the sides of housing 277 for reinforcing the housing.

Figure 6:
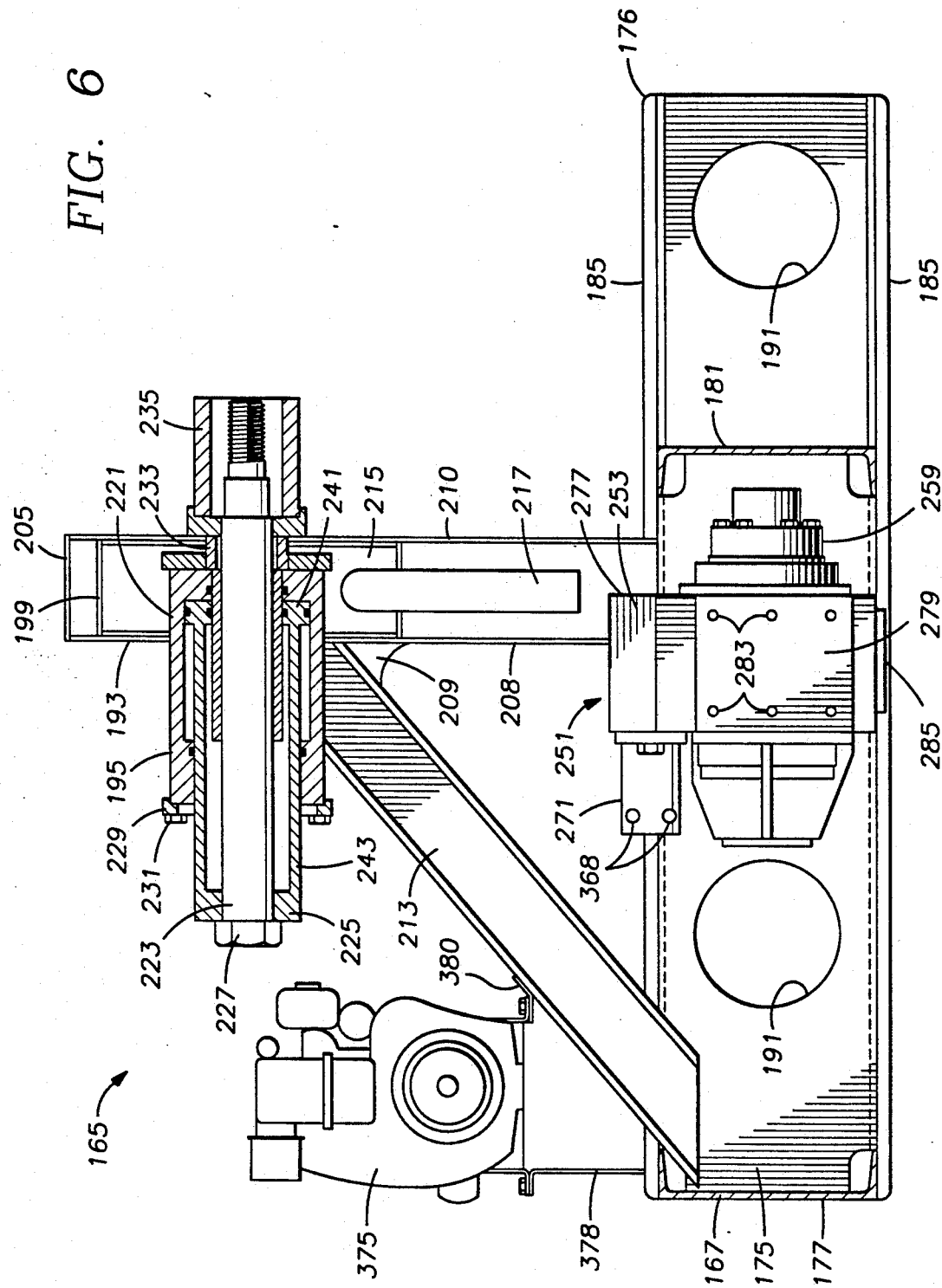
FIG. 6 is a vertical cross sectional view, partly schematic and with some parts broken away, of the movable sled of the extractor of FIGS. 1A and 1B, taken along the section lines 6—6 indicated in FIG. 8.
Figure 7:
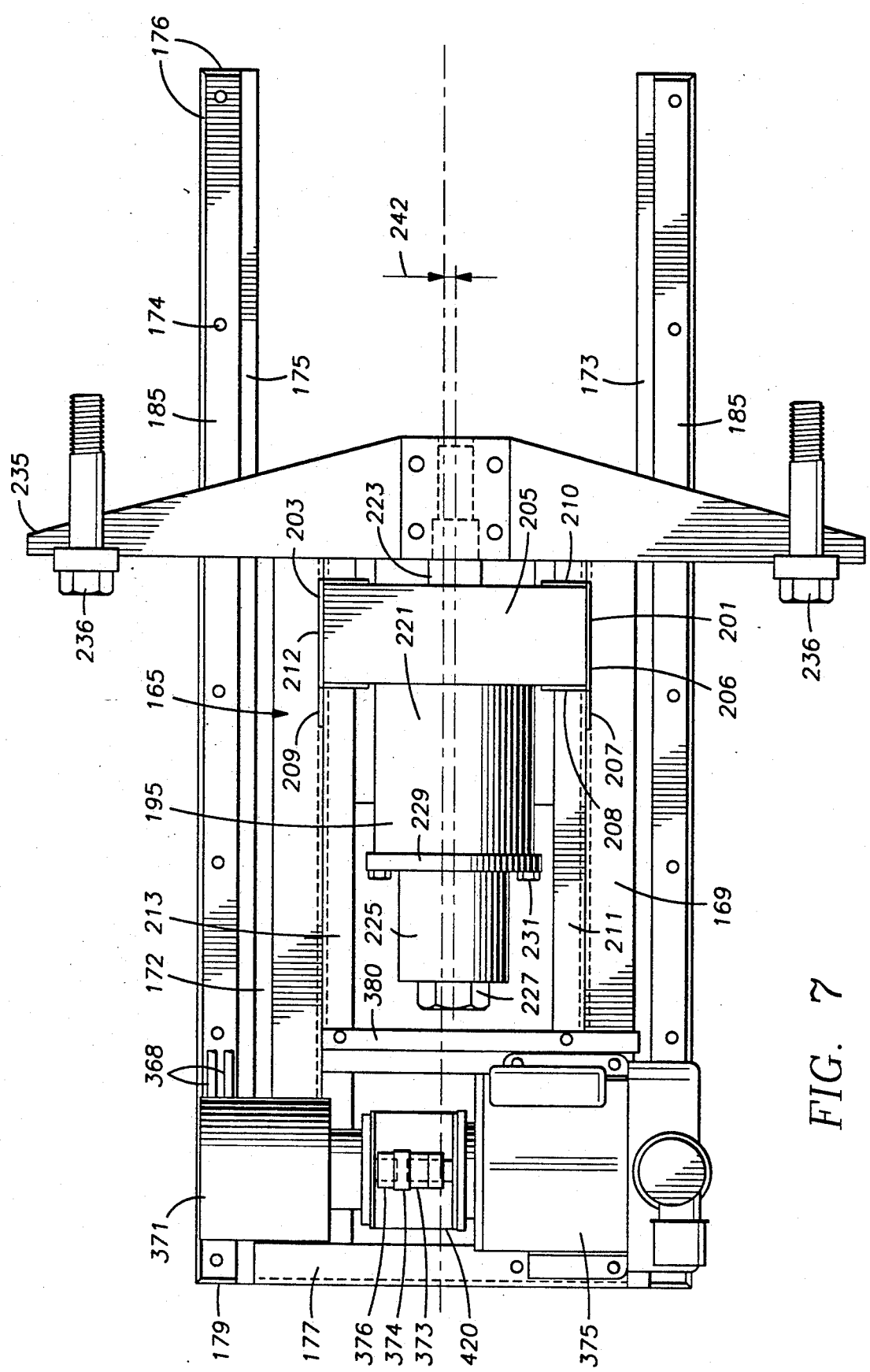
FIG. 7 is a top plan view of the sled of FIG. 6, partly in schematic form.
Figure 8:
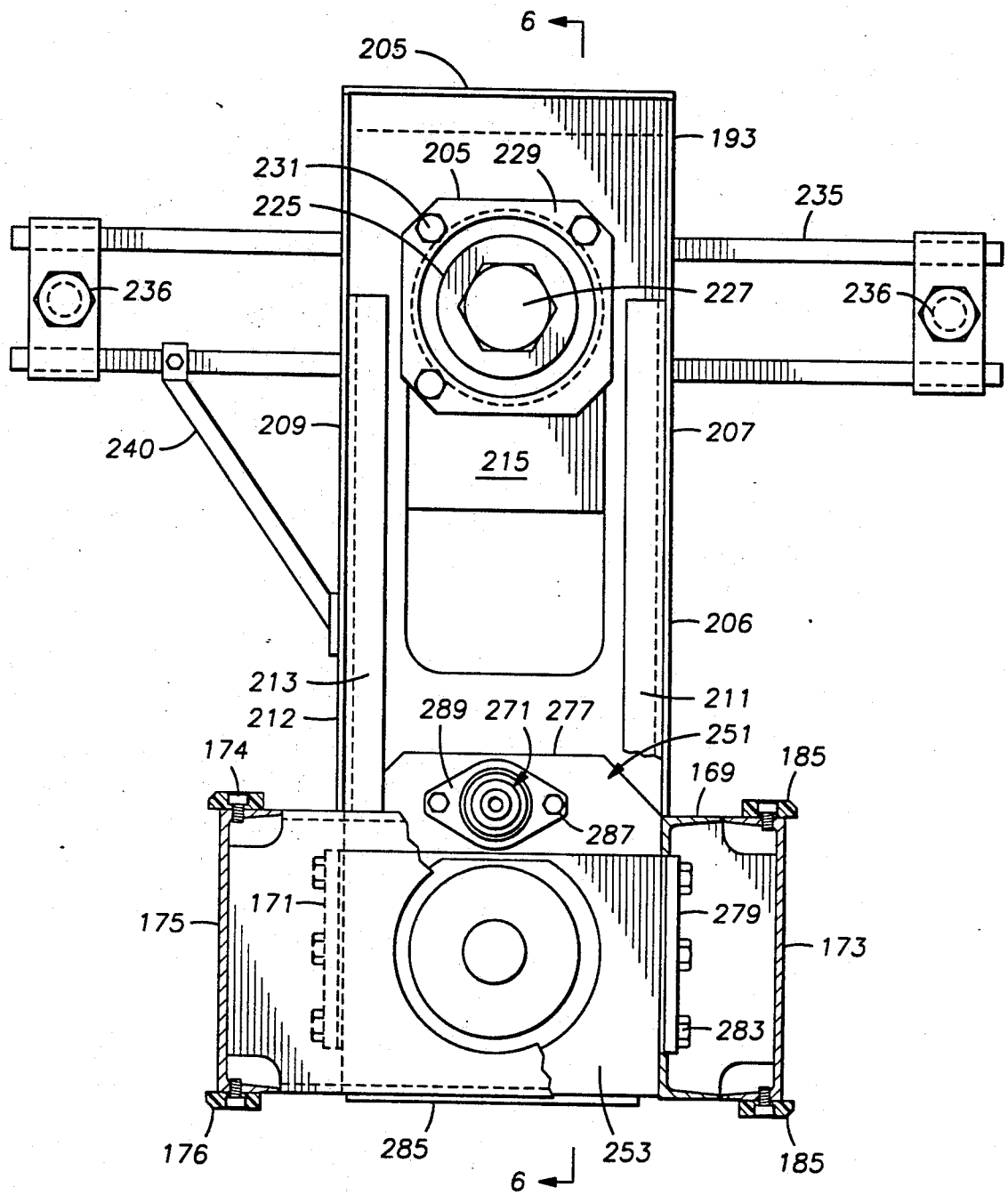
FIG. 8 is an end view of the sled of FIG. 6.
Figure 10:
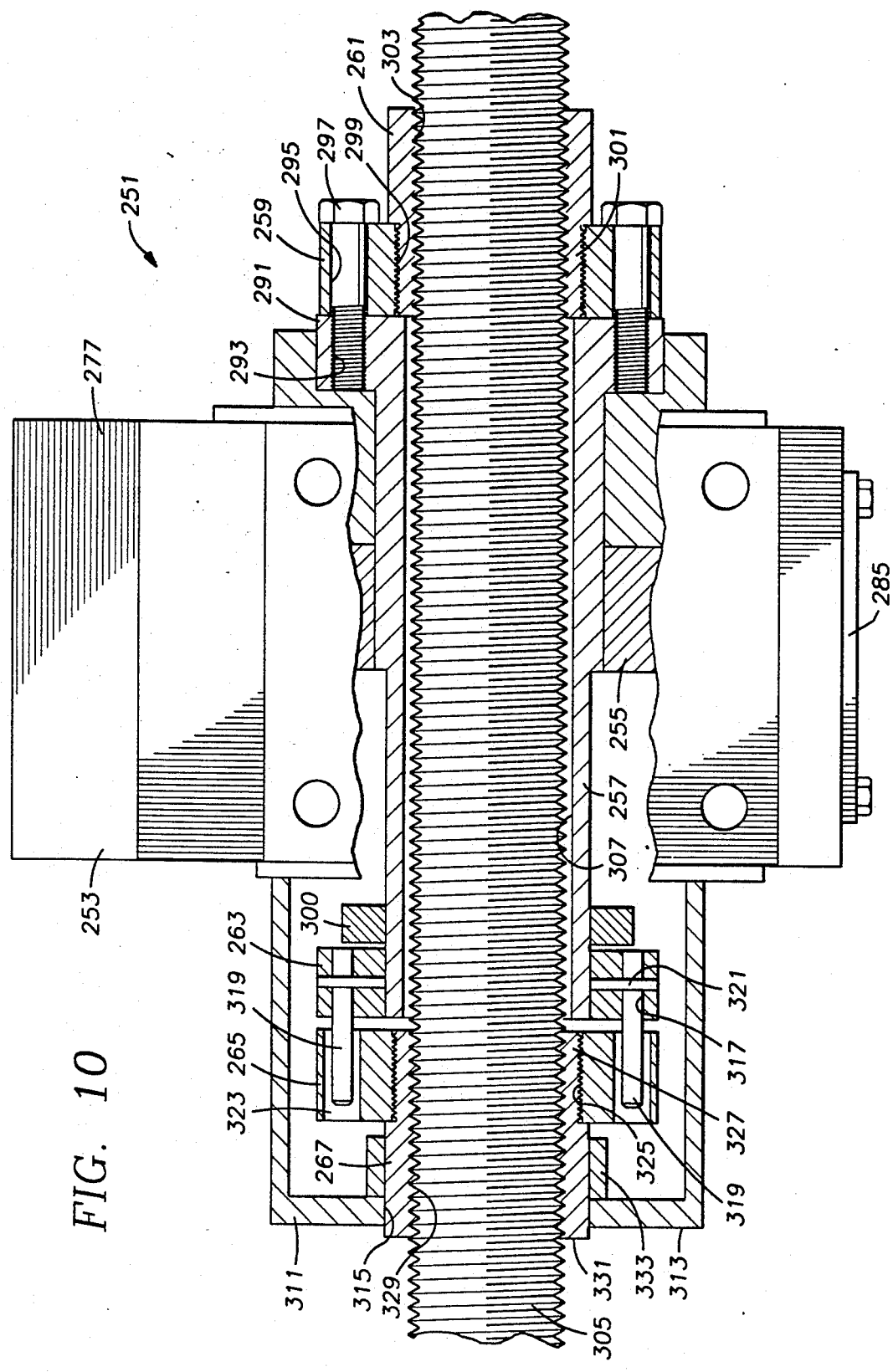
FIG. 10 is an enlarged vertical sectional view, partly schematic and with some parts broken away, of one embodiment of the gear train output gear, fixed screw shaft, drive shaft, drive nut and balance nut of the drive means of the movable sled of the extractor of the present invention.

Motor 271 is mounted in the upper center of the gear box housing 277, as by a pair of mounting bolts 287 disposed on opposite sides of a mounting flange 289 (e.g., FIGS. 6, 8, 9; for simplicity, motor 271 is not shown in FIG. 10). The rotatable output shaft of motor 271 includes a plurality of splines on its free end which engage correlatively shaped features or slots in the adjacent end face of the drive gear 273 for rotating the drive gear, which is disposed on a shaft within gear box housing 277. Drive gear 273 meshes with rotatable intermediate gear 275, which is also disposed on a shaft within gear box housing 277 and which is shown in phantom lines in FIG. 9. The intermediate gear 275 in turn meshes with rotatable output gear 255, which is antirotationally mounted on drive shaft 257. When the output shaft of motor 271 rotates, then so do the drive gear 273, the intermediate gear 275, the output gear 255, and the drive shaft 257. Preferably, the ratios of the gears comprised in the gear train 273, 275, and 255 will provide about an 18:1 reduction from the speed of the output shaft of motor 271 to the speed of the output gear 255. Thus, the output gear 255 is a relatively slow-speed gear.

The outboard end of drive shaft 257 includes a radially outwardly extending flange 291 with a plurality of longitudinally axially extending, circumferentially spaced apart threaded bores 293 therein. Annular drive nut carrier 259 is of substantially the same outer diameter as flange 291 and includes a plurality of circumferentially spaced apart, longitudinally axially extending bores 295 therethrough, which are in register with bores 293 for receiving a plurality of mounting bolts 297. Bolts 297, of which there are preferably about six (6), are inserted into bores 295 from the outboard face of nut carrier 259 and are threaded into boxes 293 for antirotationally mounting drive nut carrier 259 to flange 291 of drive shaft 257.

Drive nut carrier 259 includes a threaded central axial bore 299 for receiving the threaded end 301 of drive nut 261. Drive nut 261 is antirotationally mounted in the drive nut carrier 259, so that when the drive nut carrier rotates along with the drive shaft 257, then so does the drive nut. Drive nut 261 is internally threaded at 303 along at least a portion of its axial length for threadedly engaging a fixed screw shaft 305 disposed along the center of chassis 13 and extending from the outboard end to the inboard end of the chassis. The fixed screw shaft 305 is concentrically disposed within the central axial bore 307 of the tubular drive shaft 257, and concentrically within the central axial bores of the drive nut carrier 259, the drive nut 261, the output flange 263, the balance nut carrier or flange 265, and the balance nut 267. The threaded engagement of drive nut 261 with fixed screw shaft 305 is such that rotation of the drive nut causes the drive nut to advance or retreat i.e., to move in an outboard direction or an inboard direction, along the fixed screw shaft, depending upon the direction of rotation of the drive nut and whether the threads between the drive nut and fixed screw shaft are right-hand or left-hand threads. Thus, rotation of the drive shaft 257, nut carrier 259, and drive nut 261 causes the drive nut, and thus the sled 165, to traverse the fixed screw shaft 305. Preferably, the drive nut 261 is made of bronze or other suitable metal, and the operative threads of the drive nut and fixed screw shaft 305 preferably comprise Acme-type threads. As an example only, and not by way of limitation, the screw shaft may have an outer diameter (including threads) of about 3.375 inches, and the drive nut may be about 4.5 inches in outer diameter as well as in axial length. The drive nut may have, for example, Acme-type threads along about 2 to 2.5 inches of its axial length. The threads may have, for example, about a 0.666 lead and about a 0.666 pitch, and there may be about 1½ threads per inch. Again, for example only, an Acme-threaded screw shaft and bronze nut such as are sold by Nook Industries may be found suitable for use in the present invention.

Drive shaft 257 is supported within gear box 253 at each end by suitable bearings, e.g. as at 300, such that it will be able to withstand the loads expected in service while rotating efficiently and without undue friction or stress. As an additional aid to ensuring smooth operation of the drive means, balance nut 267 and its related structure are provided on the inboard end of the gear box 253 and at the inboard end of the drive shaft 257. One embodiment of the balance nut and its related structure is shown in FIG. 10. In that embodiment, a hollow, substantially circular cylindrical balance nut housing 311 is disposed around drive shaft 257 and fixed screw shaft 305 on the inboard end of the gear box housing 277. Balance nut housing 311 has a closed inboard end face 313 with a central aperture 315 therein through which fixed screw shaft 305 extends. Output flange 263 is antirotationally fixed to the drive shaft 257 on its inboard end, and includes a plurality of longitudinally axially extending, circumferentially spaced apart bores 317 therethrough for receiving a plurality of drive pins 319. Drive pins 319 are retained in bores 317 by transversely extending retaining pins 321 which reside in transversely extending bores through the bodies of drive pins 319. Drive pins 319 extend longitudinally axially in an inboard direction from the output flange 263. There may be, for example, a pair of such drive pins disposed on diametrically opposite sides of the output flange 263.

Balance nut carrier 265 is disposed around the fixed screw shaft 305 and comprises an annular member having a plurality of longitudinally axially extending, circumferentially spaced apart bores or slots 323 in register with bores 317 and in which drive pins 319 are received. Bores or slots 323 are preferably arcuate in configuration, providing room for limited circumferential movement of drive pins 319 in slots 323 such as to allow a limited amount of relative rotational movement between output flange 263 and balance nut carrier 265. Upon the engagement of drive pins 319 with the walls of slots 323, i.e., at the limit of such relative rotational movement between output flange 263 and balance nut carrier 265, rotation of the output flange will cause rotation of the balance nut carrier. Balance nut carrier 265 has a central axial threaded bore 325 for receiving the threaded pin end 327 of balance nut 267. Balance nut 267 is antirotationally mounted in balance nut carrier 265. Balance nut 267 has an internal thread 329 along at least a portion of its axial length for threadedly engaging the threads of the fixed screw shaft 305. The inboard end 331 of balance nut 267 is disposed in central aperture 315 of closed end 313 of housing 311. A bearing 333 surrounds the balance nut 267 and is mounted to the inside face of end wall 313 of housing 311. There is a slight axial clearance between the inboard end face of nut carrier 265 and the outboard end face of bearing 333, and between the inboard end face of the output flange 263 and the outboard end face of the nut carrier 265, e.g. when the nut carrier 265 is centered between the bearing 333 and the output flange 263, thereby permitting limited relative axial movement of the nut carrier 265 and the balance nut 267 between the bearing 333 and the output flange 263. Thus, during operation of the apparatus of the present invention, the balance nut 267 is free to move to a limited extent both rotationally and axially with respect to the output flange 263 and, thus, the drive shaft 257.

Figure 14:
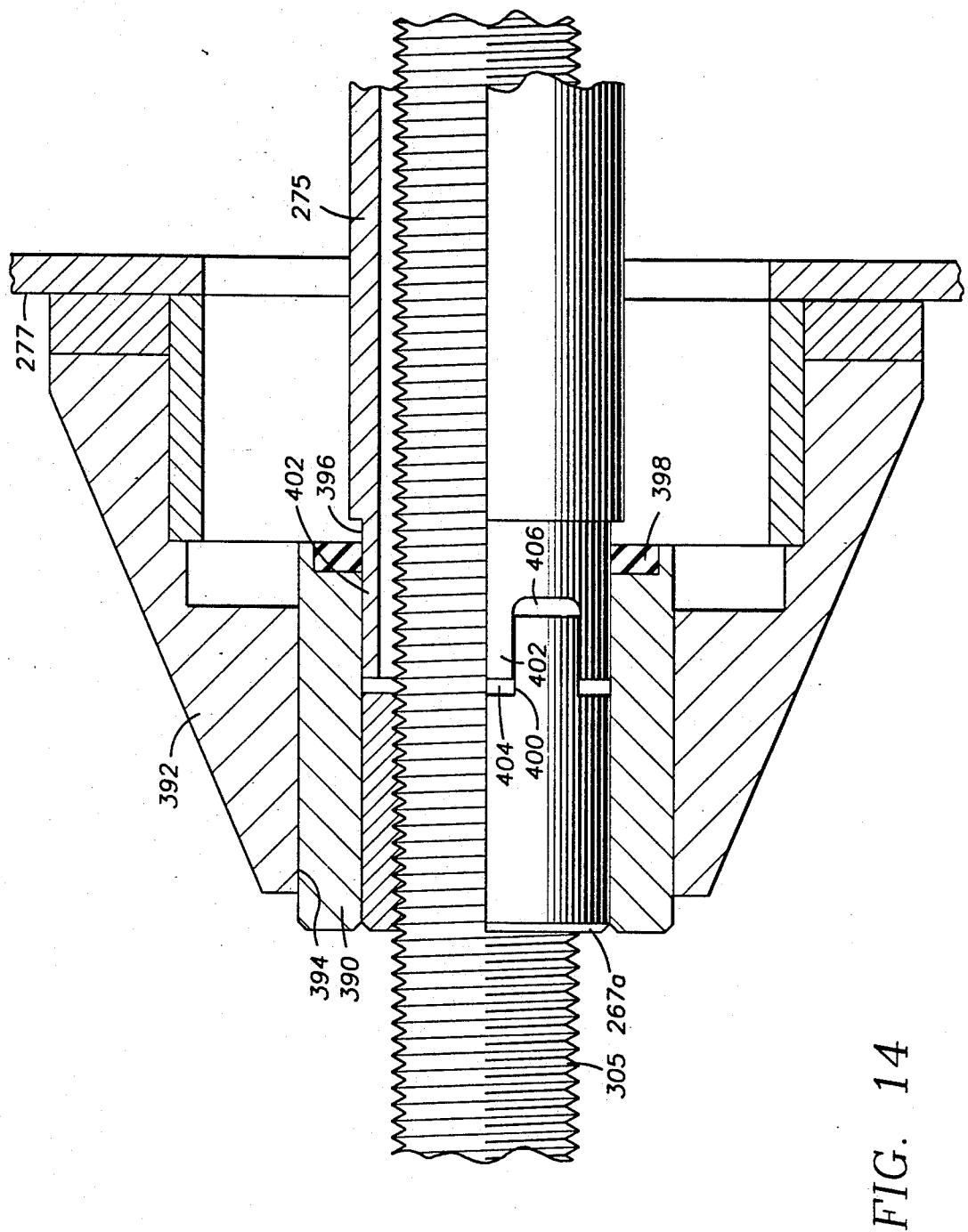
FIG. 14 is a fragmentary view similar to FIG. 10, showing an alternative embodiment of the drive shaft and balance nut of the drive means of the movable sled of the extractor of the present invention.

An alternative balance nut and related structure is shown in FIG. 14. As shown, the balance nut 267a of this embodiment is disposed within a bearing 390 retained within a tapered balance nut housing 392 disposed around drive shaft 257 and fixed screw shaft 305 on the inboard end of the gear box housing 277. Balance nut housing 392 has a central aperture 394 within which bearing 390 is disposed. Drive shaft 257 includes a reduced outer diameter portion 396 on its inboard end, extending into the bore of bearing 390. A seal 398 is retained within the bearing 390 and seals against the reduced outer diameter portion 396 of drive shaft 257. The outboard end of the balance nut 267a includes a plurality of longitudinally axially extending, circumferentially spaced apart slots 400 within which are disposed a plurality of correlatively shaped tangs 402 on the inboard end of drive shaft 257. There may be, for example, four such slot/tang features on the nut 267a and shaft 257. It should be understood that the placement of the slot(s) and tang(s) can be reversed, that is, the slot(s) can be on the drive shaft and the tang(s) can be on the balance nut, or some combination of such placement can also be used. The slots and tangs of nut 267a and shaft 257 serve to antirotationally couple the output shaft 257 to the balance nut 267a. Balance nut 267a has an internal thread along at least a portion of its axial length for threadedly engaging the threads of the fixed screw shaft 305. There is a slight axial clearance between the terminal ends of the nut 267a and shaft 257, including the slots and tangs, as shown at 404, 406, thereby permitting relative axial movement of the nut 267a and the shaft 257. Thus, during operation of the apparatus of the present invention, the balance nut 267a is free to move axially with respect to the drive shaft 257, thereby preventing any jam nut effect of the balance nut 267a.

Balance nut 267, 267a will not be subjected to as great a load in service as will drive nut 261. In operation, drive nut 261 should preferably be able to bear a pulling or pushing force of about 60,000 pounds; balance nut 267, 267a will never be subjected to an axial force. Balance nut 267, 267a serves to balance some of the side loads or bending forces acting on the sled 165 and fixed screw shaft 305 in service, providing lateral support for the shaft in two spaced apart locations, i.e., that of the drive nut and that of the balance nut. This assists in keeping the fixed screw shaft from bending excessively and in keeping the drive means 251 properly aligned with the screw shaft so as to avoid any tendency of the drive nut to "lock up" or become stuck or jam on the screw shaft and cease operating easily along the shaft. Although it is preferred that a metal such as bronze be used for the balance nut, as in the case of the drive nut, a nonmetal such as a plastic having sufficient strength, toughness, and durability to withstand the conditions and loads expected in service can also be used.

The fixed screw shaft 305 is restrained at the opposite ends of the chassis 13 and prevented from rotating with respect to the chassis. The opposite ends of the shaft 305 may be configured with a polygonal profile in transverse cross section, such as, for example, a hexagonal profile, and disposed in mounting plates 343 having correlatively shaped apertures, such as hexagonal as aforesaid, affixed by bolts 343a to the cross members 35, 37 and 39, 41 at the outboard end and the inboard end, respectively, of the chassis. The ends of shaft 305 are also restrained by mounting plates 343 so as to resist pulling or pushing forces, i.e., forces acting in a longitudinal direction along the shaft 305, but are permitted to "float" or move up and down and from side to side a limited amount by oversized holes in which the mounting bolts 343a are received to accommodate slight movements of the shaft 305 in such directions without causing undue stress in the shaft.

With the sled 165 disposed in position for service between the I-beams of the chassis 13 (FIGS. 1 and 3), with the gear box 253 substantially centered between the I-beams, an inboard rubber boot 351 is disposed around the fixed screw shaft 305 between the inside face of the inboard end of the chassis 13 and the inboard end face of the balance nut housing of gear box 253. An outboard rubber boot 353 is disposed around the fixed screw shaft 305 between the inside face of the outboard end of the chassis 13 and the outboard end face of the drive nut 261. Boots 351, 353 are preferably made of a plurality of reinforced rubber (or other suitable elastomeric material) saucer-shaped disks with central apertures through which the screw shaft extends, which are placed face to face in pairs and then sewn together into an elongate tubular unit. Boots 351, 353 are expandable and compressible so that when sled 165 is at the end of its travel along chassis 13, one of the boots will be expanded and the other will be contracted. Referring to FIG. 1, for example, there is shown, for ease of reference and explanation, the sled 165 in both its fully inboard position in FIG. 1A, and its fully outboard position in FIG. 1B. With the sled in its fully inboard position, boot 351 will be contracted or compressed and boot 353 will be expanded, again as shown in FIG. 1A. With the sled in its fully outboard position, boot 351 will be stretched or expanded and boot 353 will be compressed, again as shown in FIG. 1B. Boots 351, 353 serve primarily as protective means for the screw shaft, to prevent dirt and/or debris from interfering with proper operation of the drive means 251.

A plurality of movable supports 361 (FIGS. 1 and 5), which preferably comprise hollow sheet metal beams, are placed under the tube bundle 161 as it emerges from the shell 45 when pulled by sled 165 in order to provide support for the tube bundle at selected locations along its axial length and to prevent the tubes comprised in the bundle from sagging, bending, or even breaking as the tube bundle is moved along the chassis. Additional support for the tubes of the tube bundle is typically provided by a plurality of axially spaced apart baffles 362 which may comprise, for example, plates having holes for supporting a number of the individual tubes therewithin. Baffles 362 may be circular, for example, for supporting all of the tubes of the bundle, or they may be semicircular, for example, for supporting half of the tubes as shown in FIG. 1. Of course, they may be of any appropriate shape. Supports 361 have an upper support surface 363 in their centers in the shape of an upwardly facing cradle in which the tube bundle rests. The movable supports 361 extend substantially the entire width of the chassis 13 and have downwardly facing support surfaces 365 on their undersides at each of their ends, which are in turn supported on the upper flanges of the I-beams of the chassis. The upper outer surfaces of the upper flanges of the chassis I-beams 15, 17 have disposed thereon a plurality of rub strips 367 of a material such as that used for rub strips 185 of sled 165, for providing a lubricious surface along which the support surfaces 365 of the movable supports 361 may slide as the tube bundle traverses the chassis. Support surfaces 365 of movable supports 361 are supported on the upper surfaces of the rub strips 367. The upper surfaces of the ramps 75, 77 preferably are, for the most part, not provided with rub strips, so that when the movable supports 361 slide along the upper surfaces of the ramps, they are sliding metal-on-metal. There preferably is some overlap, however, of the rub strips 367 on the ramp surfaces at the pivot end of the ramps in order to provide a relatively smooth transition surface between the ramps and the adjacent chassis surfaces.

Motor 271 preferably is a hydraulic motor which is operated through a fluid pump 371 disposed on a pump support 420 on the sled 165. The hydraulic pump and motor preferably form elements of a closed loop hydrostatic power transmission system for the present invention, which will also include a suitable hydraulic fluid reservoir (not shown) for maintaining the supply of hydraulic fluid for the system. In such a hydrostatic transmission system, the speed of hydraulic motor 271 will thus depend on the output of pump 371. Thus, for a given load of tube bundle, the motor speed may be adjusted by adjusting the output of pump 371 to result in the desired speed of movement of sled 165 along chassis 13 with tube bundle 161 attached. Pump 371 is preferably connected via a flexible coupling, comprising half coupling 373, urethane insert 374, and splined half coupling 376, to a prime mover or power source 375, mounted on rear mount 378 and front mount 380 on sled 165, for operating the pump, which may be a relatively small conventional gasoline powered engine, a diesel engine, a gas turbine, or some other type of prime mover. If prime mover or power source 375 were a gasoline powered engine, a diesel engine, or a gas turbine, for example, there will also be a fuel storage tank disposed on the sled 165, for example on the engine itself, for supplying fuel to the prime mover 375. Preferably, prime mover 375 need be capable of operating merely in a power range of between about 10 horsepower and about 30 horsepower. As an example only, and not by way of limitation, engine 375 may be a relatively small motorcycle engine.

The fluid lines 368 connecting hydraulic motor 271 to pump 371 may be fixed metal tubing or the like, but may also be flexible hoses if desired. Fixed metal tubing may be used between motor 271 and pump 371 because the motor and pump will not be moving with respect to one another to any significant extent. Fixed metal tubing is preferred over flexible hoses since metal tubing will require less maintenance and upkeep than flexible hoses, which not only must be repaired from time to time, but also replaced. The breakout cylinder 195 of sled 165 will also preferably be operated with hydraulic fluid supplied through the same hydraulic system as the pump 371 and motor 271, but flexible hoses must be used to supply hydraulic fluid to the breakout cylinder because it will be moving with respect to the source of such fluid, by virtue of the raising and lowering of elevator 199.

It should be understood that although a hydrostatic power transmission system is preferred for the present invention, including variable displacement hydraulic pump 371 and fixed displacement hydraulic motor 271, it is only one of a number of means of effectively delivering and controlling the power provided to the gear box 253; for example, any conventional mechanical transmission system could be used instead. In the case of a mechanical transmission, the output could be coupled to the input of gear box 253, if necessary, or directly to drive shaft 257.

As an example (and not by way of limitation) of the performance specifications applicable to motor 271 and gear box 253, the motor 271 may be designed to provide an input of about 900 rpm (revolutions per minute) and a torque of about 86 pound feet when fully loaded at its slowest speed, resulting in an output from the gear box 253 of about 50 rpm and 1560 pound feet of torque for drive shaft 257 when fully loaded. Such rotation should be sufficient to result in extraction of a tube bundle from its shell, or reinsertion of the tube bundle back into its shell, in about three minutes, thirty or forty seconds or less, for twenty-two foot tube bundles, for example. Motor 271 may have a speed of about 4860 rpm when not fully loaded, at its highest speed. For a given maximum expected load from the tube bundle and the load speed desired for the loaded locomotive, the power and speed of motor 271 and the gear ratios of gear box 253 should be considered along with parameters of the threaded screw shaft and drive nut (for example, thread lead, thread pitch, threads per inch) in order to obtain the required drive shaft rotation. The drive means 251 is designed to provide about 60,000 pounds of force in a dynamic condition, that is, when pushing or pulling a tube bundle. The gear box 253 will thus be provided with appropriate thrust bearings to carry the expected dynamic load, as well as to bear an expected static load of about 150,000 pounds. As further examples of the performance characteristics expected of extractor 11, the extractor should have the capacity to extract and insert bundles of about 22 feet in length and 48 inches in diameter, and weighing up to about 30 tons. The sled 165 should have the capacity to handle tube sheets up to about 6 inches thick. As indicated earlier, the extractor of the present invention should be able to handle tube sheets as large as 72 inches in diameter. The overall weight of the extractor 11 should be under 10,000 pounds. Again, these dimensions and weights should be considered as examples only; additional capacity can be designed into extractor 11 as necessary under the particular circumstances of each case. As those skilled in the art will no doubt appreciate, the extractor 11 of the present invention exhibits a low unit weight to pulling-/pushing power ratio, e.g., 10,000 pounds to 60,000 pounds or 1:6 (or 1/6), and a low unit weight to load capacity ratio, e.g., 10,000 pounds to 60,000 pounds (30 tons) or also 1:6 (or 1/6), which are believed to give the present invention a considerable advantage over prior art systems and devices.

Figure 12:
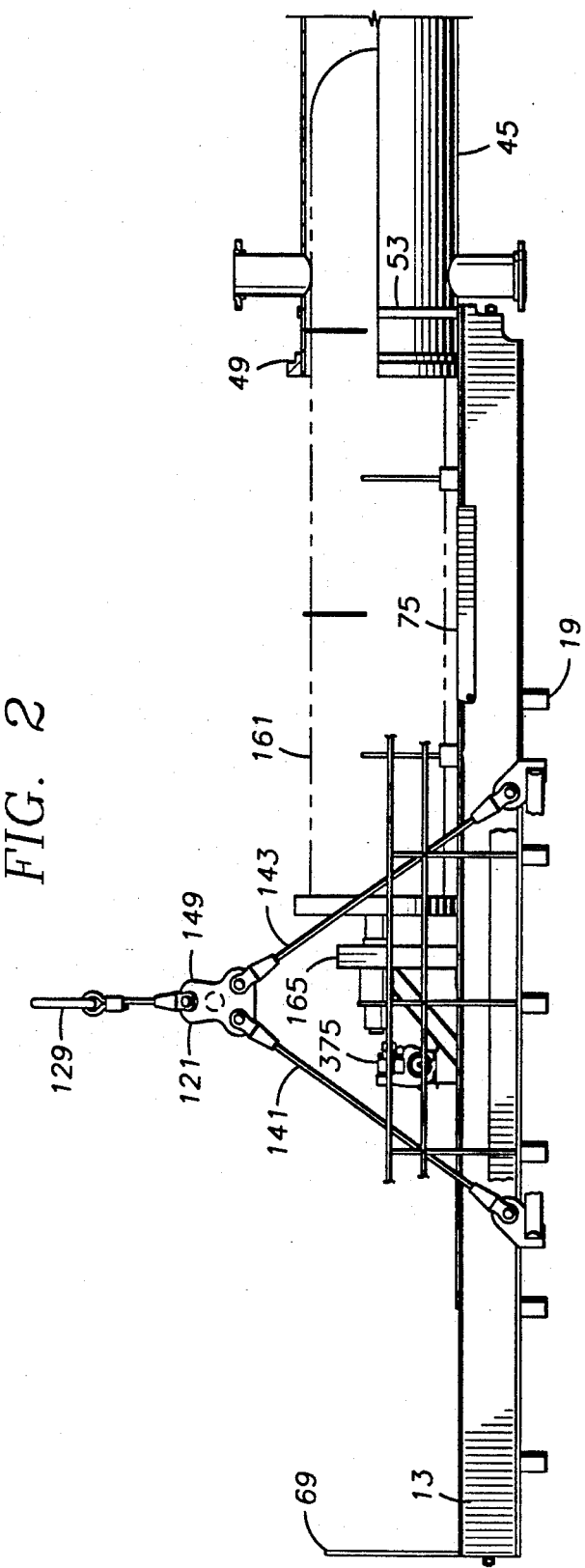
FIG. 12 is a view similar to FIG. 11, with some parts broken away, of the extractor of the present invention with a tube bundle disposed on the chassis and partially removed from its shell.
Figure 11:
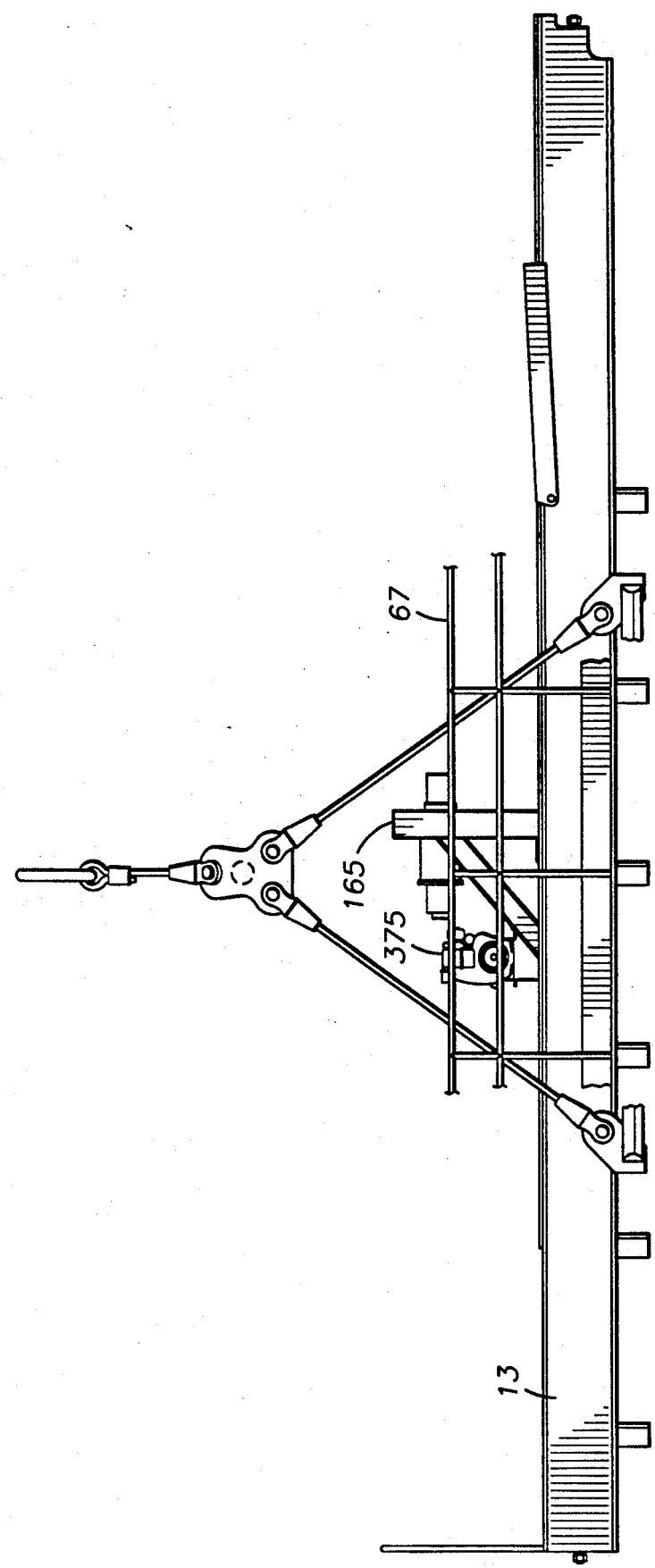
FIG. 11 is a side elevational view, partly schematic and with parts missing for clarity, of the chassis of the extractor of the present invention balanced in its sling for lifting to an aerial heat exchanger, with the movable sled of the present invention centrally disposed on the chassis for ensuring such balance.

In order to extract a tube bundle 161 from its shell 45, the device of the present invention is lifted by a crane or the like and placed in axial alignment with the heat exchanger with its outboard end adjacent the front end of the heat exchanger. Prior to placing the extractor in position adjacent the heat exchanger, however, the sling is preferably placed in a central position with respect to its travel limits on the chassis with hand-operated hydraulic jack 162 and cylinders 154 or the like, and the extractor is lifted slightly, i.e., several inches, off the ground. The drive means 251 of locomotive 165 is then actuated to move the locomotive in an outboard direction or an inboard direction, if necessary, in order to balance the extractor in its sling. FIG. 11 shows an example of one such balanced configuration. With the extractor so balanced in its sling, the crane will be able to lift the extractor safely the rest of the way to place it adjacent the heat exchanger, without the risk of an unbalanced load causing accidental injury or damage to equipment or personnel. When the extractor is in position adjacent to the heat exchanger, the outboard end of the chassis is placed under the shell 45 and the chassis cradle 46 is engaged with, for example, the front and back surfaces of lip 49 of annular flange 51 of shell 45, as well as the underside of the shell. Adjustable tie-down loop means 53 is placed around the body of shell 45 behind flange 51, and tightening means 55 is actuated for tightening the noose formed thereby. The extractor 11 will then be securely, releasably mounted on the shell. Locomotive 165 is then moved to an outboard position and beam 235 is attached to the tube sheet 197. The elevator 199 is actuated up or down as needed, as by a hand-operated hydraulic pump, to ensure proper alignment of the beam 235 with respect to the tube bundle. The breakout cylinder 195 is actuated, if necessary, to break the tube bundle 161 from the shell 45 in the event the bundle has become stuck in the shell. When the tube bundle is released from the shell, the drive means 251 is actuated to cause the locomotive 165 to move in an inboard direction along the fixed screw shaft on the chassis in order to extract the tube bundle from the shell. Movable supports 361 are placed at selected locations along the tube bundle as the bundle is being extracted. The elevator ramps 75, 77 may be actuated if necessary in order to assist in the bundle removal process. FIG. 12 illustrates the tube bundle partially removed from the shell, i.e., either during the removal or reinstallation process.

When the tube bundle is completely removed from the shell and in final position on the chassis, the placement of the sling 121 with respect to the chassis 13 may be adjusted if necessary in order to ensure that the load carried by the sling, i.e., the entire extractor and the tube bundle, will be balanced when the extractor is released from the shell. In order to achieve proper balance, the tie-down loop 53 is loosened, and the sling 121 is moved one way or the other on the chassis, for example with the hand-operated hydraulic pump or jack 162 referred to above, until the operator observes that the load is substantially balanced. That is, the sling is moved back and forth if necessary until the tendency of the outboard end of the extractor to move readily up or down is eliminated. When an acceptable balanced condition is achieved, the tie-down loop is removed and the extractor is disengaged from the heat exchanger shell. FIG. 13 illustrates an example of such a balanced configuration, with the extractor disengaged from the heat exchanger shell. As shown in FIG. 13, the elevator ramps 75, 77 may be in raised position for supporting the rear end of the tube bundle at this stage of the process. This will also prove convenient when the bundle is to be replaced in the shell, because raising the elevator ramps is usually desirable to assist in lifting the rear end of the tube bundle over the front edge or lip of the shell. With the bundle disposed on the chassis as shown in FIG. 13, the crane may then lower the extractor 11 and the extracted tube bundle 161 to the ground for removal of the bundle from the chassis and delivery of the bundle to an on-site or remote cleaning facility.

When cleaning is complete, the tube bundle is replaced on the chassis at substantially the same axial location it was in prior to its removal from the chassis, for balanced lifting of the extractor back to the shell. See FIG. 13. The extractor is then reconnected to the shell, the drive means 251 activated to cause the locomotive 165 and bundle 161 to move in an outboard direction along the screw shaft and the chassis toward the shell (see FIG. 12), and the ramps 75, 77 activated if necessary (if not already in raised position) to help lift the bundle to assist in the bundle reinsertion process, that is, to help ease the bundle back into the shell. When the bundle is completely reinserted in the shell, the locomotive and sling are returned to their previously-determined balanced positions with respect to the empty chassis, and the extractor is removed from the shell. See FIG. 11. The extractor may then be lifted to another heat exchanger for another extraction operation, or lowered to the ground and placed on stand-by or the like.

While preferred embodiments of the invention have been shown and described, many modifications thereof may be made by those skilled in the art without departing from the spirit of the invention. For example, while sled 165 has been shown and described as being slidable along the chassis, as an alternative the sled may comprise, for example, a wheeled vehicle or the like, rollable along the I-beam flanges of the chassis. In addition, while chassis 13 has been shown in the drawings and described in the foregoing specification, in a preferred embodiment, as being supported in a sling for lifting by a crane or the like, the chassis of the present invention may be supported from a truck, cart, or other vehicle, which may include telescoping arms or a boom or the like for lifting the chassis above the ground or other support surface. Moreover, the chassis of the present invention may be mounted in a fixed position with respect to the ground or other support surface on a movable frame, a truck or other vehicle, or some other support structure, if the circumstances of the particular heat exchanger(s) to be cleaned so permit. It will thus be appreciated by those skilled in the art that the principle of the locomotive movement of the sled along the chassis, as by use of a rotatable drive nut and fixed screw shaft of the drive means of the present invention, is equally applicable to tube bundle extractors of any type, be they crane-lifted, truck mounted, fixed, or whatever. Moreover, instead of a fixed screw shaft on the chassis and a rotatable drive nut on the sled, the locomotive movement of the sled along the chassis may be effected through, for example, a rack and pinion arrangement whereby a fixed rack is longitudinally disposed along the center of the chassis, and a rotatable pinion is disposed on the sled, in engagement with the rack; rotation of the pinion causes it, and the attached sled, to traverse the rack. Alternatively, a ratcheting or telescoping cylinder could be disposed on the sled, whereby the cylinder successively extends and retracts, engaging and disengaging from the chassis, which moves the sled in increments along the chassis. Other movable means, disposed on the sled, of powering the sled along a fixed chassis structure will no doubt become apparent to persons of ordinary skill in the art upon referring to the present specification and drawings. Accordingly, the scope of the invention should be determined in accordance with the following claims.

We claim:

1. A heat exchanger tube bundle extractor, the heat exchanger having a tube bundle telescopingly disposed within a shell, comprising:

a chassis having an inboard end and an outboard end and including means for supporting the tube bundle when partially or fully removed from the shell, said outboard end including means for releasably engaging the shell;

carriage means disposed on said chassis for releasably engaging the tube bundle and adapted for locomotive movement along said chassis in an inboard direction for extracting the tube bundle from the shell and in an outboard direction for inserting the tube bundle back into the shell;

said carriage means including drive means engageable with said chassis for effecting said locomotive movement, and power generation and transmission means for powering said drive means.

2. An extractor according to claim 1, wherein said chassis includes a fixed screw shaft longitudinally disposed between said outboard end and said inboard end along the midportion of said chassis, and said drive means includes a rotatable drive nut mounted on said carriage means and threadedly disposed on said fixed screw shaft.

3. An extractor according to claim 2, wherein said drive means is adapted for attaining a predetermined load speed for said carriage means along said chassis when loaded with an engaged tube bundle, and wherein said drive means includes a motor having a rotating output shaft, a rotatable drive shaft on which said drive nut is mounted, and a gear train having an input gear and an output gear disposed between said output shaft of said motor and said drive shaft, said gear train and said motor being cooperable for translating rotation of said output shaft of said motor to rotation of said drive shaft at least at the required speed for attaining said predetermined load speed.

4. An extractor according to claim 3, wherein said gear train is adapted to cause rotation of said drive shaft at a reduced speed from the speed of said motor output shaft.

5. An extractor according to claim 3, wherein said gear train is adapted to cause rotation of said drive shaft at an increased torque from the torque of said motor output shaft.

6. An extractor according to claim 3, wherein said gear train is adapted to cause rotation of said drive shaft at a reduced speed and increased torque from the speed and torque of said motor output shaft.

7. An extractor according to claim 3, wherein said drive shaft comprises a tubular member having a longitudinal axial bore for housing said fixed screw shaft therewithin, said output gear of said gear train being mounted on said drive shaft, said drive nut being nonrotatably mounted on one end of said drive shaft.

8. An extractor according to claim 3, wherein said motor is a hydraulic motor.

9. An extractor according to claim 8, wherein said power generation and transmission means includes a hydraulic pump mounted on said carriage means and engageable with said hydraulic motor for actuating said hydraulic motor and a prime mover mounted on said carriage means and engageable with said pump for actuating said pump.

10. An extractor according to claim 9, wherein fluid communication between said pump and said motor is effected through rigid metal tubing.

11. An extractor according to claim 9, wherein said prime mover is a diesel engine.

12. An extractor according to claim 9, wherein said prime mover is a gasoline powered engine.

13. An extractor according to claim 9, wherein said prime mover is a gas turbine.

14. An extractor according to claim 9, wherein said prime mover is a small motorcycle engine.

15. An extractor according to claim 2, wherein said drive means is adapted for attaining a predetermined load speed for said carriage means along said chassis when fully loaded with an engaged tube bundle, and wherein said power generation and transmission means includes a prime mover disposed on said carriage means for generating power and a mechanical transmission disposed on said carriage means between said prime mover and said drive means for transferring power from said prime mover to said drive means, and wherein said drive means includes a rotatable drive shaft on which said drive nut is mounted, said drive shaft being rotatable by said mechanical transmission at least at the required speed for attaining said predetermined load speed.

16. An extractor according to claim 15, wherein said prime mover is a diesel engine.

17. An extractor according to claim 15, wherein said prime mover is a gasoline powered engine.

18. An extractor according to claim 15, wherein said prime mover is a gas turbine.

19. An extractor according to claim 15, wherein said prime mover is a small motorcycle engine.

20. An extractor according to claim 2, wherein said chassis includes an expandable and contractible rubber boot disposed on said screw shaft between said carriage means and the outboard end of said chassis, and between said carriage means and the inboard end of said chassis.

21. An extractor according to claim 1, wherein said extractor has a low unit weight to pulling/pushing power ratio.

22. An extractor according to claim 1, wherein said extractor has a low unit weight to load capacity ratio.

23. An extractor according to claim 1, and further including support means engageable with said chassis for supporting said chassis above the ground or other support surface, said support means being axially movable with respect to said chassis to a limited extent for balancing said chassis in said support means when so supported.

24. An extractor according to claim 1, wherein said means of said chassis for supporting the tube bundle includes strips of a lubricious material disposed thereon for reducing the friction between the tube bundle and said chassis.

25. A heat exchanger tube bundle extractor, the heat exchanger having a tube bundle telescopingly disposed within a shell, comprising:

a chassis having an inboard end and an outboard end and including means for supporting the tube bundle when partially or fully removed from the shell, said outboard end including means for releasably engaging the shell, said chassis including a fixed screw shaft longitudinally disposed between said outboard end and said inboard end along the midportion of said chassis;

carriage means disposed on said chassis for releasably engaging the tube bundle and adapted for locomotive movement along said chassis in an inboard direction for extracting the tube bundle from the shell and in an outboard direction for inserting the tube bundle back into the shell;

said carriage means including drive means engageable with said chassis for effecting said locomotive movement, said drive means being adapted for attaining a predetermined load speed for said carriage means along said chassis when loaded with an engaged tube bundle, said drive means including a rotatable drive nut mounted on said carriage means and threadedly disposed on said fixed screw shaft, and further including a motor having a rotating output shaft, a rotatable drive shaft on which said drive nut is mounted, and a gear train having an input gear and an output gear disposed between said output shaft of said motor and said drive shaft, said gear train and said motor being cooperable for translating rotation of said output shaft of said motor to rotation of said drive shaft at least at the required speed for attaining said predetermined load speed, said drive shaft comprising a tubular member having a longitudinal axial bore for housing said fixed screw shaft therewithin, said output gear of said gear train being mounted on said drive shaft, said drive nut being nonrotatably mounted on one end of said drive shaft, and power generation and transmission means for powering said drive means, said drive means including a balance nut connected to the other end of said drive shaft and threadedly disposed on said fixed screw shaft.

26. An extractor according to claim 25, wherein said balance nut is connected to said drive shaft such that said balance nut is permitted a limited amount of rotational and axial movement with respect to said drive shaft.

27. An extractor according to claim 26, wherein said carriage means includes a balance nut housing surrounding said screw shaft and having a shoulder, said drive shaft includes an outwardly extending flange on said other end, and said balance nut is disposed in said balance nut housing between said shoulder and said flange, the axial distance between said shoulder and said flange being greater than the axial length of said balance nut, and wherein said flange includes an axially extending pin and said balance nut includes a circumferentially extending slot for receiving said pin, said slot being greater in length than the diameter of said pin such that said pin is free to move rotationally within said slot to a limited extent.

28. An extractor according to claim 25, wherein said drive nut and said balance nut are made of metal.

29. An extractor according to claim 28, wherein said drive nut and said balance nut are made of bronze.

30. An extractor according to claim 25, wherein said balance nut is made of a nonmetal.

31. An extractor according to claim 25, wherein said balance nut is made of plastic.

32. An extractor according to claim 25, wherein one of the outboard end of said balance nut and the inboard end of said drive shaft includes at least one slot, and the other of the outboard end of said balance nut and the inboard end of said drive shaft includes at least one tang, said tang being received in said slot for antirotationally coupling said balance nut and said drive shaft together, there being an axial clearance between the ends of said balance nut and said drive shaft, including said slot and said tang, for permitting relative axial movement between said balance nut and said drive shaft.

33. A heat exchanger tube bundle extractor, the heat exchanger having a tube bundle telescopingly disposed within a shell, comprising:
a chassis having an inboard end and an outboard end and including means for supporting the tube bundle when partially or fully removed from the shell, said outboard end and including means for releasably engaging the shell, said chassis including a fixed screw shaft longitudinally disposed between said outboard end and said inboard end along the midportion of said chassis;
carriage means disposed on said chassis for releasably engaging the tube bundle and adapted for locomotive movement along said chassis in an inboard direction for extracting the tube bundle from the shell and in an outboard direction for inserting the tube bundle back into the shell;
said carriage means including drive means engageable with said chassis for effecting said locomotive movement, said drive means including a rotatable drive nut mounted on said carriage means and threadedly disposed on said fixed screw shaft, and power generation and transmission means for powering said drive means;
said chassis including a pair of upright, transversely spaced apart, substantially parallel I-beams between which said screw shaft is disposed, said I-beams having substantially vertical bodies and substantially horizontal flanges, and said carriage means including an elongate frame disposed between said bodies and said flanges of said I-beams and slidingly engageable therewith.

34. An extractor according to claim 33, wherein said elongate frame of said carriage means includes a pair of upright, transversely spaced apart, substantially parallel outer carriage beams having a C-shaped profile in transverse cross section, said outer carriage beams having substantially vertical bodies and substantially horizontal flanges and with the flanges extending inwardly of said carriage means.

35. An extractor according to claim 34, and further including strips of a lubricious material disposed on the surfaces of said outer carriage beams where said outer carriage beams contact said I-beams.

36. An extractor according to claim 35, wherein said strips of lubricious material are disposed on the upper surfaces of the upper flanges, and the lower surfaces of the lower flanges.

37. An extractor according to claim 36, wherein said strips are made of brass.

38. An extractor according to claim 34, wherein said elongate frame of said carriage means includes a pair of upright, transversely spaced apart, substantially parallel inner carriage beams having a C-shaped profile in transverse cross section, said inner carriage beams being disposed inwardly of said outer carriage beams, said inner carriage beams having substantially vertical bodies and substantially horizontal flanges and being disposed with their flanges extending outwardly of said carriage means, said inner and outer carriage beams being connected to axially spaced apart cross members.

39. An extractor according to claim 38, wherein said drive means is disposed between and mounted to said bodies of said inner carriage beams.

40. An extractor according to claim 34, wherein said vertical bodies of each of said outer carriage beams include an access opening therethrough permitting access to the interior of said frame through said outer beams from the outsides thereof.

41. An extractor according to claim 40, wherein each of said outer carriage beams includes an access opening in both the outboard portion and the inboard portion of said elongate frame.

42. A heat exchanger tube bundle extractor, the heat exchanger having a tube bundle telescopingly disposed within a shell, comprising:
a chassis having an inboard end and an outboard end and including means for supporting the tube bundle when partially or fully removed from the shell, said outboard end including means for releasably engaging the shell;
carriage means disposed on said chassis for releasably engaging the tube bundle and adapted for locomotive movement along said chassis in an inboard direction for extracting the tube bundle from the shell and in an outboard direction for inserting the tube bundle back into the shell;
said carriage means including drive means engageable with said chassis for effecting said locomotive movement, and power generation and transmission means for powering said drive means, said carriage means including an engagement beam for attaching to the tube bundle, and elevator means for alternately raising or lowering said engagement beam to a limited extent.

43. An extractor according to claim 42, wherein said carriage means includes double acting breakout cylinder means attached to said engagement beam for moving said engagement beam in an inboard direction to a limited extent.

44. An extractor according to claim 43, wherein said breakout cylinder means is capable of exerting up to 150,000 pounds of force in an axial direction on said tube bundle.

45. A heat exchanger tube bundle extractor, the heat exchanger having a tube bundle telescopingly disposed within a shell, comprising:
a chassis having an inboard end and an outboard end and including means for supporting the tube bundle when partially or fully removed from the shell, said outboard end including means for releasably engaging the shell, said chassis including a fixed screw shaft longitudinally disposed between said outboard end and said inboard end along the midportion of said chassis;
carriage means disposed on said chassis for releasably engaging the tube bundle and adapted for locomotive movement along said chassis in an inboard direction for extracting the tube bundle from the shell and in an outboard direction for inserting the tube bundle back into the shell;
said carriage means including drive means engageable with said chassis for effecting said locomotive movement, said drive means being adapted for attaining a predetermined load speed for said carriage means along said chassis when loaded with an engaged tube bundle, said drive means including a rotatable drive nut mounted on said carriage means and threadedly disposed on said fixed screw shaft, and further including a motor having a rotating output shaft, a rotatable drive shaft on which said drive nut is mounted, and a gear train having an input gear and an output gear disposed between said output shaft of said motor and said drive shaft, said gear train and said motor being cooperable for translating rotation of said output shaft of said motor to rotation of said drive shaft at least at the required speed for attaining said predetermined load speed, and power generation and transmission means for powering said drive means, said motor being a hydraulic motor, and wherein said power generation and transmission means includes a hydraulic pump mounted on said carriage means for actuating said hydraulic motor, and wherein said carriage means includes an engagement beam for attaching to the tube bundle, elevator means for alternately raising or lowering said engagement beam to a limited extent, and double acting breakout cylinder means attached to said engagement beam for moving said engagement beam axially to a limited extent, said breakout cylinder means also being actuated by said hydraulic pump.

46. An extractor according to claim 45, and further including a prime mover disposed on said carriage means and engageable with said pump for actuating said pump.

47. A heat exchanger tube bundle extractor, the heat exchanger having a tube bundle telescopingly disposed within a shell, comprising:

a chassis having an inboard end and an outboard end and including means for supporting the tube bundle when partially or fully removed from the shell, said outboard end including means for releasably engaging the shell;

carriage means disposed on said chassis for releasably engaging the tube bundle and adapted for locomotive movement along said chassis in an inboard direction for extracting the tube bundle from the shell and in an outboard direction for inserting the tube bundle back into the shell;

said carriage means including drive means engageable with said chassis for effecting said locomotive movement, and power generation and transmission means for powering said drive means, said chassis including ramp means disposed near its outboard end for alternately raising and lowering the tube bundle to a limited extent.

48. A heat exchanger tube bundle extractor, the heat exchanger having a tube bundle telescopingly disposed within a shell, comprising:

(a) a chassis having an inboard end and an outboard end, and including a pair of parallel, transversely spaced apart, upright I-beams;

a plurality of transversely extending, longitudinally axially spaced apart, tubular lower braces connected between said I-beams to the lower faces of their bottom flanges;

said tubular lower braces including upwardly extending side braces disposed on each of their ends for forming substantially U-shaped structural support members for said chassis;

means connected between said I-beams for keeping their inboard and outboard ends from moving axially with respect to one another;

a first cross member connected between said I-beams at their outboard ends, and a second cross member connected between said I-beams at their inboard ends;

(b) carriage means disposed between said I-beams for releasably engaging the tube bundle and adapted for locomotive movement between said I-beams and between said first and second cross members; and (c) said carriage means including drive means engageable with said chassis for effecting said locomotive movement, and power generation and transmission means for powering said drive means.

49. An extractor according to claim 48, wherein said chassis is constructed of steel.

50. An extractor according to claim 48, wherein said tubular lower braces have a rectangular profile in transverse cross section, and sides of inverted trapezoidal configuration.

51. An extractor according to claim 48, wherein said chassis includes a fixed screw shaft connected to said first and second cross members between said I-beams and substantially centered with respect thereto, and said drive means includes a rotatable drive nut mounted on said carriage means and threadedly disposed on said fixed screw shaft.

52. An extractor according to claim 51, wherein said fixed screw shaft is nonrotatably connected to said first and second cross members, the connections between said shaft and said cross members including means for permitting said shaft to be movable to a limited extent with respect to said cross members in directions transverse to the longitudinal axis of said chassis.

* * * * *